United States Patent
Lager et al.

(10) Patent No.: US 6,636,502 B1
(45) Date of Patent: Oct. 21, 2003

(54) GPRS-SUBSCRIBER SELECTION OF MULTIPLE INTERNET SERVICE PROVIDERS

(75) Inventors: Per Lager, Johanneshov (SE); Kurt Essigmann, Herzogenrath (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/160,318

(22) Filed: Sep. 25, 1998

(30) Foreign Application Priority Data

Sep. 26, 1997 (DE) .......................... 197 42 681

(51) Int. Cl.[7] ............................................ H04L 12/64
(52) U.S. Cl. ........................................ 370/352; 370/354
(58) Field of Search .......................... 370/338, 352–356

(56) References Cited

U.S. PATENT DOCUMENTS 6,061,346 A * 5/2000 Nordman .................... 370/352

FOREIGN PATENT DOCUMENTS

| DE | 19611947 | 6/1997 |
| WO | WO 97/09837 | 3/1997 |
| WO | WO 97/26739 | 7/1997 |

OTHER PUBLICATIONS

"Digital Cellular Telecommunications System (Phase 2+); General Packet Radio Service (GPRS); Service Description; Stage 2 (GSM 03.60 proposed version 2.0.0)", May 1997.
"Digital Cellular Telecommunications System (Phase 2+); General Packet Radio Service (GPRS); GPRS Tunnelling Protocol (GTP) across the Gn and Gp Interface; (GSM 09.60 proposed version 1.1.0)", Jun. 1997.
"Packet Radio Service for GSM Network", Jari Hämäläinen and Hannu H. Kari, 1995.

* cited by examiner

Primary Examiner—Melvin Marcelo

(57) ABSTRACT

A switching device (PLMN-SW) in a mobile radio communication system (PLMN) which supports a GPRS-network allows to connect a terminal station (GPRS-MS) of the mobile radio communication network (PLMN) with one of a plurality of packet data communication networks (PDN1, PDN2, IN). The selection of the packet data communication network (PDN1, PDN2, IN) is based on the transmission of a specific network indication parameter (NIP) from the terminal station (GPRS-MS) of the mobile radio communication network (PLMN). The network indication parameter (NIP) is transmitted to a serving (GPRS) support node (SGSN) as a special parameter in a PDP context activation procedure. Thus, a large number of internet service providers (ISP1, ISP2, ISP3) can be connected to a GPRS-network.

26 Claims, 12 Drawing Sheets

GPRS-SUBSCRIBER SELECTION OF MULTIPLE INTERNET SERVICE PROVIDERS

FIELD OF THE INVENTION

The invention relates to a method, a switching device, a telecommunication system and a terminal station, in particular for a GSM-based General Packet Radio Service system (GPRS), that allow a subscriber station to select a predetermined network of several packet data networks (PDNs) connected to a gateway GPRS support node (GGSN). The packet data networks can be any kind of packet data networks or Internet Service Providers (ISPs).

BACKGROUND OF THE INVENTION

The standardization of the GSM General Packet Radio Service (GPRS) is currently in progress at the European Telecommunication Standards Institute (ETSI). GPRS is a new GSM-service that provides actual packet radio access for mobile GSM users. According to the GPRS system radio resources are reserved only when there is something to send (due to the packet nature of this system) and the same radio resource is shared by all mobile stations in a cell, providing effective use of the scarce resources. GPRS facilitates a variety of applications, such as telemetry, train control systems, interactive data access, charging systems and Internet browsing using WorldWideWeb.

Contrary to the circuit switched nature of the GSM network, the operation of GPRS is adapted to offer a connection to a standard data network (using protocols such as TCP/IP, X.25 and CLNP). By contrast, the conventional GSM network was originally designed to offer only circuit switched voice sessions. The packet-orientated GPRS network infrastructure introduces new functional elements which will hereinafter be briefly described with reference to FIG. 1.

It should be noted that still some cooperation exists between elements of the current GSM services and the new GPRS network. On the physical layer, resources can be refused and some common signaling features exist. In the same radio carrier there can be time slots reserved simultaneously for circuit-switched and GPRS use. The most optimum resource utilization is obtained through dynamic sharing between circuit-switched and GPRS channels. During the establishment of a circuit switched call, there is still enough time to pre-empt the GPRS sources for circuit-switched cells that have higher priority.

Interaction of GSM Network and GPRS Network

FIG. 1 is a simple overview of the interaction of GSM circuit switched features and elements of the GPRS packet switched system. The GPRS Support Node GSN is the main element and provides connection and interworking with various data networks, mobility management by means of the GPRS registers and of course the delivery of data packets to mobile stations GPRS-MS independently of their location. Physically, the GSN can be integrated in the mobile switching center MSC of the PLMN (Public Land Mobile Network). Alternatively it can be a separate network based on the architecture of data network routers. The user data flows between the GSN and the base station sub-system (BSS) and a signaling is exchanged between the MSC and the GSN.

Thus, the GPRS provides a bearer service from the boundary of a data network to a GPRS MS. The users of the bearer service are the public network layer software packages (such as IP, OSI CLNP and X.25). Also, GPRS-specific applications will use the GPRS service.

GPRS uses a packet mode technique to transfer high-speed and low-speed data and signaling in an efficient manner. GPRS optimizes the use of the network resources and minimizes the load on the radios system. Strict separation between the radio subsystem and network subsystem is maintained allowing the network subsystem to be reused with other radio access technologies. GPRS as such does not mandate changes to an installed MSC base.

New GPRS radio channels are defined and the allocation of these channels is flexible: From 1 to 8 radio interface time slots can be allocated per TDMA frame and time slots are shared by the active users with the up-link and down-link allocated separately. The radio interface sources can be shared dynamically between speech and data services as a function of service load and operator preference. Various radio channel coding schemes are specified to allow bit rates from 9 to more than 150 Kbyte/s per user. It is even estimated that a raw data rate of up to 200 Kbyte/s can be obtained per user.

As explained above, applications based on standard data protocols are supported and interworking is defined with IP networks and X.25 networks. Specific point-to-point and point-to-multipoint services are supported for applications such as traffic telemetric and UIC train control. GPRS also allows a short message service (SMS) transfer over the GPRS radio channels.

GPRS is designed to support from intermittent and bursty data transfers through to occasional transmission of large volumes of data. Four different Quality of Service (QoS) levels (there QoS are set initially during a PDP-context activation procedure as explained below) are supported. GPRS is designed for fast reservation to begin a transmission of packets, to 0.5 to 1 seconds. Charging will typically be based on the amount of data transferred due to the packet nature of transmission.

Terminal Stations Supporting GPRS

In GPRS three different classes of GPRS mobile stations are supported: a class-A MS can operate GPRS and other GSM services simultaneously. A class-B MS can monitor control channels for GPRS and other GSM services simultaneously, but can only operate one set of services at one time. A class-C GPRS MS can exclusively operate GPRS services.

Data Packet Transmission

Having generally set up the GPRS support nodes GSN in FIG. 1, of course one of the main problems in GPRS network is the routing of data packets to/from a mobile station MS. This problem can be divided into two sub-problems, namely the data packet routing and the mobility management.

Data packet routing to a mobile station MS is a problem in the GPRS network, since the mobile station's data network address typically has a static routing mechanism, while the mobile station MS can roam from one network to another. One approach for a data packet routing in a mobile environment is the concept of mobile IP. (C. Perkins (editor): "IP Mobility Support, draft ietf-mobileip-protocol-11.txt", July 1995, Work in progress in the Internet Engineering Task Force).

Mobile IP enables the routing of IP datagrams to mobile hosts, independent of the sub-network of point of attachment. Another approach is taken in the system for cellular digital packet data (CDPD) where the routing to mobile host is handled internally by the network (CDPD Industry Input Coordinator, "Cellular Digital Packet Data System Specification", Release 1.0, July 1993).

The standard mobile IP concept does not fit exactly in the GPRS environment because of the requirement that network protocols other than IP must also be supported. Therefore, for the routing of the data packets the structure of the telecommunication network in FIG. 1 (comprising general GPRS nodes GSN) is constructed in a concept similar to the mobile IP concept as is shown in FIG. 2.

GPRS Support Nodes

In FIG. 2, GPRS introduces two new network nodes in the GSM PLMN: The serving GPRS support node (SGSN), which is at the same hierarchical level as the MSC (Mobile Switching Center) keeps track of the individual mobile stations' location and performs security functions and access control. The SGSN is connected to the base station system with frame relay. Thus, the main functions of the SGSN are to detect new GPRS MSs in its service area, to handle a process of registering the new MSs in the GPRS registers, to sent/receive data packets to/from the GPRS MS and keep a record of the location of MSs inside of its service area. The subscription information is stored in a GPRS register where the mapping between a mobile station's identity (such as MS-ISDN or IMSI: International Mobile Station Identity) and the PSPDN address is stored. The GPRS register acts as a data base from which the SGSNs can ask whether a new MS in its area is allowed to joint the GPRS network.

The gateway GSN (GGSN) provides interworking with external packet switched networks and is connected with SGSNs via an IP based GPRS backbone network (IP: Internet protocol). The aforementioned GPRS registers can be provided in the HLR which is thus enhanced with the GPRS subscriber information. Optionally, the MSC/VLR can be enhanced for more efficient coordination of GPRS and non-GPRS services and functionality: e.g. paging for circuit switched calls which can be performed more efficiently via the SGSN and combined GPRS and non-GPRS location updates.

As also shown in FIG. 2 (although not relevant in the present application), the SGSN of course cooperates with a short message service gateway MSC SMS-GMC via a Short Message Service interworking MSC (SMS-IWMSC).

Furthermore, it should be noted that the SGSN performs authentication and cipher setting features based on the same algorithms, keys and criteria as in existing GSM. GPRS uses a ciphering algorithm optimized for packet data transmission.

GPRS Access by a Mobile Station

In order to access the GPRS services, the mobile station must first make its presence known to the network by performing a GPRS attach. This operation establishes a logical link between the mobile station and the SGSN and makes the mobile station available for SMS over GPRS, paging via SGSN and notification of incoming GPRS data. In order to send and receive GPRS data, the mobile station must activate the packet data address (PDN-address) that it wants to use. This operation makes the mobile station known in the corresponding GGSN and interworking with external data networks can commence.

User data is transferred transparently between the mobile station and the external data networks with a procedure known as encapsulation and tunneling (the exchange of tunneling messages is part of the PDP-context activation procedure): data packets are equipped with GPRS-specific protocol information and are transferred between the mobile station and the GGSN. This transparent transfer method lessens the requirement for the GPRS PLMN to interpret internal data protocols and it enables easy introduction of additional interworking protocols in the future. User data can be compressed and detected with retransmission protocols for efficiency and reliability.

Thus the GPRS support node in its general form (GSN) contains functionality required to support GPRS. In one PLMN, there may be more than one GSN as is seen in FIG. 3.

The gateway GPRS support node (GGSN) is the node which is accessed by the packed data network due to evaluation of the so-called PDP address. This address contains routing information for attached GPRS users. The routing information is used to tunnel protocol data units (PDUs) to the current point of attachment of the mobile station, i.e. to the respective serving GPRS support node (SGSN). The GGSN may request location information from the HLR via the optional Gc interface. The GGSN is the first point of PDN (Packet Data Network) interconnection with a GSM PLMN, supporting GPRS (i.e. the Gi reference point is supported by the GGSN).

Intranetworks and Internetworks Connected to GPRS

While FIG. 1 shows the general structure of the embedding of the GPRS functionalities in a GSM system, FIG. 3 shows additional networks within the PLMNs needed as GPRS backbone networks.

The intra-PLMN backbone network is the internet protocol network interconnecting GSNs within the same PLMN. The Inter-PLMN backbone network is the IP network interconnecting GSNs and intra-PLMN backbone networks in different PLMNs. Every intra-PLMN backbone network is a private IP network intended for GPRS data and GPRS signaling only. Such a private IP network is an IP network to which some access control mechanism is applied in order to achieve a required level of security.

Intra-PLMN backbone networks are connected via the Gp interface using border gateways (BGs) and an inter-PLMN backbone network. The Inter-PLMN backbone network is selected by a roaming agreement that includes the BG security functionality. The BG is not defined within the scope of GPRS. The inter-PLMN backbone can be a packet data network. For example, the intra-PLMN backbone network can be a corporate network and the packet data network can be a public internet or a leased line.

Finally, the HLR shown in FIG. 2 contains the GPRS subscription data and routing information. This HLR is accessible from the SGSN via the Gr interface and for roaming mobile stations MSs HLR may be in a different PLMN than the current SGSN to which the mobile station is connected.

Therefore, in FIG. 3 the HLR can be located in PLMN A or PLMN B.

Example of GPRS Communication

Having described the general architecture of the GPRS system in FIGS. 1–3, FIG. 4 shows an illustrative example how the routing of information can be performed in such a system. As shown in FIG. 4, within the GPRS mobile communication system there are 3 different routing schemes and thus 3 examples of possible applications for the present invention are as follows:

mobile originated message (path P1)

mobile terminated message when the mobile station (MS) is in its home network (path P2); and mobile terminated message when the mobile station (MS) has roamed to a network of another GPRS operator (path P3).

As in FIG. 3, also in FIG. 4 the operator's GPRs network consists of multiple GSNs and an intra-operator backbone network. The intra-operator backbone network connects the support nodes of one operator using operator-specific network protocols that can be different for each operator. With interworking capabilities, the GGSN can, however, be connected to data networks and to an inter-operator backbone network that connects the GPRS networks of different operators using one standard protocol.

The main benefits of this proposed architecture are its flexibility, scalableness and interoperability. This approach allows each operator PLMN A, B to implement an individual backbone network using any protocol, by communications while other GPRS operators are implemented using only one common protocol. ETSI has selected IPv6 to be the main backbone protocol in the future. IPv4 has been selected as the intermediate backbone protocol.

As is seen in FIG. 4, from standpoint of data network, the GPRS network resembles a sub-network in the data network. For example, in the internet, the GGSN acts like an IP router behind which the entire GPRS network is hidden. A computer in the internet network then sees the GPRS as an IP sub network to which the messages are sent as if the GPRS network was a completely standard internet implementation. The routing mechanism in the data network is then exactly the same as with the normal internet receiver case.

According to a first example of data routing shown in FIG. 4 and being related to path P1, the GPRS mobile station sends a data packet, i.e. a packet data unit PDU of a public switched packet data network PSPDN to a data network. The PSPDN PDU data packet is sent using the LLC (Logical Link Control) protocol over the air interface to the GPRS Serving Support Node SGSN currently serving the GPRS mobile station MS. In case the GPRS Serving Support Node SGSN has received the data packet error free, it encapsulates the PSPDN PDU data packet into the GPRS backbone network data packet that is sent to the GPRS Gateway Support Node (GGSN) handling the traffic from the GPRS mobile station MS to the data networks. The GPRS gateway support nodes GGSN decapsulates the PSPDN PDU data packet and forwards it to the appropriate data network.

As shown in FIG. 4, a second example for the application of the invention is related to a path P2 where a host in a data network is sending a PSPDN PDU data packet to a GPRS mobile station MS located in the home GPRS network. Here, compared to the first example outlined above, the PSPDN PDU data packet is routed in reverse direction using the routing mechanisms in the data network until the PSPDN PDU data packet arrives at the GPRS Gateway Support Node GGSN. In the GPRS Gateway Support Node the PSPDN address of the GPRS mobile station MS is extracted and the current location of the GPRS mobile station MS is mapped. Then, routing of the PSPDN PDU data packet in the home GPRS network is carried out. Thus, the PSPDN PDU data packet is first encapsulated into a backbone network and then sent to the GPRS serving support node SGSN currently serving the GPRS mobile station MS.

The last example shown in FIG. 4 relates to path P3 and is almost identical to example P2. Here, the GPRS mobile station MS has roamed to another GPRS network and the home GPRS network must send the PSPDN PDU data packet over the inter-operator backbone network to the visited GPRS network. Thus, according to this example, there is involved an additional GPRS Gateway Support Node GGSN to provide the data packet to the roaming GPRS mobile station MS. Then, the visited GPRS network routes the PSPDN PDU data packet further to the appropriate GPRS Serving Support Node, as is outlined above with respect to the second example.

Log-on Procedure of GPRS-MS

A typical log-on procedure of a GPRS mobile station MS which desires the transmission of data packets is shown in FIG. 5. The main objective of this log-on procedure is to send the PSPDN address of the GPRS mobile station MS to the GPRS network, to report on the current whereabouts of the GPRS mobile station MS, to create entries for the assigned PSPDN address in the routing table of the GPRS gateway support node GGSN and to initiate charging in statistical procedures, respectively.

During the GPRS log-on procedure, the context (the content or the parameter sets) of the logical link between the MS and the SGSN is established using the GSM stand-alone dedicated control channel (SDCCA) as a carrier. During the context establishment, the GPRS mobile station is also authenticated and ciphering parameters are exchanged between the GPRS mobile station MS and the GPRS Serving Support Node SGSN (this authentication/ciphering procedure is carried out separately to the PDP context activation described below; see the GSM 03.60 document).

The registration is then forwarded to the GPRS Gateway Support Node in which the location of the GPRS mobile station MS is updated. Here, the GPRS Gateway Support Node GGSN may inform a previous GPRS Serving Support Node SGSN to remove the GPRS mobile station MS from the previous registers. In case the GPRS log-on procedure is successful, the GPRS mobile station enters the stand-by state. Finally, the GPRS mobile station can exit the GPRS service by initiating a GPRS log-off procedure similar to the log-on procedure.

PDP-context Activation Procedure

At PDP context activation, the SGSN establishes a so-called PDP context to be used for routing purposes inside the GPRS PLMN with the GGSN that the GPRS subscriber is using. Such a PDP context activation procedure is shown in FIG. 6.

A point-to-point (PTP) GPRS subscription contains the subscription of one or more PDP addresses (e.g. in the HLR) Each PDP address is described by an individual PDP context in the mobile station MS, the SGSN and the GGSN. Every PDP context exists independently in one of two PDP states. The PDP state indicates whether the PDP address is activated for data transfer or not. All PDP contexts of a subscriber are associated with the same MM context for the IMSI of that subscriber.

Thus, the PDP context is an information set held in the mobile station MS and GSNs for the PDP address as is described in "Digital Cellular Telecommunication System (Phase 2+); General Packet Radio Services (GPRS); GPRS Tunneling Protocol (GTP) across the Gn and Gp interface; (GSM 09.60 proposed version 1.1.0), Draft TS100 960 proposed V1.1.0 (published by the European Telecommunications Standards Institute ETSI, June 1997).

Upon receiving an activate PDP context request message, the SGSN shall initiate procedures to set up PDP contexts. Therefore, a valid request initiates the creation of a tunnel between a PDP context in a SGSN and a PDP context in a GGSN. That is, after a successful PDP context activation procedure during or after the log-on procedure in FIG. 5, a PDP context has been agreed upon between the SGSN and the GGSN (and thus the GPRS mobile station), which will be used for the packet data transmission. The list of PDP context information parameters is shown in table 5 of the GSM 0360 proposed version 2.0.0 document (published by ETSI, May 1997).

The conventional PDP context activation procedure in FIG. 6 comprises the following four steps S1, S2, S3, S4.

In step S1, the mobile station MS sends an activate PDP context request (TLLI, QoS requested, NSAPI) message to the SGSN. The mobile station MS indicates that it wishes to use a dynamic PDP address by selecting a NSAPI (network layer service access point identifier) referring to a PDP context that indicates a dynamic address of the desired type.

In step S2, security functions are executed.

In step S3, the SGSN checks that the NSAPI matches a PDP context in the subscription data which were stored in the SGSN during the GPRS log-on (attach). If the mobile station MS requests a PDP context with dynamic address, then the SGSN lets a GGSN allocate the dynamic address (the GGSN used is either the GGSN address stored in the PDP context or, if this field is empty, a suitable GGSN chosen by the SGSN). The SGSN may restrict the required QoS values given its capabilities, the current load and the subscribed QoS level.

Thus, in step S3', the SGSN sends a create PDP context request (IMSI, PDP type, PDP address, QoS negotiated, TID) message to the affected GGSN. The PDP address is set to zero if the dynamic address is requested. The GGSN creates a new entry in its PDP context table. The new entry allows the GGSN to route PDP PDUs between the SGSN and the external PDP network.

In step S3", the GGSN then returns a Create PDP context response (TID, PDP address, BB protocol, Cause) message to the SGSN. The PDP address is included if the GGSN allocated a PDP address. The BB protocol indicates whether TCP or UDP shall be used to transport user data on the backbone network between the SGSN and GGSN. The create PDP context messages are send over the GPRS backbone network.

In step S4, the SGSN inserts the PDP address received from the GGSN in its PDP context. The SGSN returns an Activate PDP Context Accept (TLLI, PDP type, PDP address, NSAPI, QoS negotiated, Cause) message to the MS. After step S4, the SGSN is now able to route PDP PDUs between the GGSNs and the mobile station MS.

For each PDP address, a different quality of service (QoS) may be requested. For example, some PDP addresses may be associated with e-mail that can tolerate lengthy response times. Other applications cannot tolerate delay and demand a very high level of throughput, interactive applications being one example. These different requirements are reflected in the QoS parameter. The QoS values are defined in GSM 02.60. If a QoS requirement is beyond the capabilities of a PLMN, the PLMN negotiates the QoS as close as possible to the requested QoS. The MS either accepts the negotiated QoS, or deactivates the PDP context. After a SGSN has successfully updated the GGSN, the PDP contexts associated with an MS is distributed as shown in subclause "Information Storage" of the GSM 03.60.

If the PDP context activation procedure fails or if the Activate PDP Context Accept Cause parameter indicates a reject, then the MS may attempt another activation to the same PDP address up to a maximum number of attempts.

Whilst every GPRS mobile station must always carry out the procedure in FIG. 6., further details of the modified PDP context activation procedures can be taken from the aforementioned two ETSI documents (which also give a description of other abbreviations used for parameters in the above description generally known to the person skilled in mobile communications).

SUMMARY OF THE INVENTION

As explained above, in order to allow a packet data transmission from a GPRS mobile station MS to a packet data network supporting a packet data protocol like IP or X.25 (which is connected to the GGSN) in FIGS. 1 to 4, it is necessary that a log-on procedure or PDP context activation procedure is carried out as described with reference to FIGS. 5, 6. This activation procedure is used to create a tunnel between a PDP context in a SGSN and a PDP context in a GGSN.

Essentially, the PDP context can be seen as a set of parameters agreed upon between the SGSN and the GGSN for a packet transmission using a specific protocol. Typical parameters which have conventionally been used in this set of parameters are the MS-ID, the QoS, the NSAPI, the TEPI, and the PDP-address. In particular, a GPRS subscriber identified by an IMSI, shall once have one or more network layer addresses, i.e. PDP addresses, temporarily and/or permanently associated with it that conform to the standard addressing scheme of the respective network layer service used, e.g.:

an IP version 4 address;

an IP version 6 address; or an X.121 address.

PDP addresses are activated and deactivated through MM procedures described in subclause "PDP Context Activation and Deactivation Functions" in the GSM 03.60 document.

Once the tunnel has been set up by the PDP context activation, a packet data transmission can take place as explained for the examples 1, 2, 3 in FIG. 4. It should also be understood that the above set-up procedures need to be carried out in any telecommunication system that uses an embedded packet radio service within a conventional circuit switched PLMN environment.

As is seen in FIG. 7 (together with FIGS. 2, 3), there is a need to connect a large number of internet service providers ISP to a GPRS network (i.e. to the GGSN thereof) in order to attract as many customers as possible. In FIG. 7, even an intra-PLNM backbone network connected to a GPRS network (or a GGSN node thereof as is seen in FIG. 3) is considered as an internet service provider ISP, because technically there is no difference because in terms of interconnection both are connected to the GGSN.

As explained above, on the basis of the PDP context activation procedure, the current GPRS standard (GSM 03.60) already allows the possibility to interconnect the GGSN node to a large number of internal networks (ISPs). A subscriber can have a subscription (typically in the HLR) to one or several of such networks, e.g. subscription to his company internet (in FIG. 7: corporate network like ERI-NET at Ericsson) or to a packet data network (in FIG. 7: X.25 PDN) and to one or more internet service providers (in FIG. 7: local ISP, ISP1, ISP2). During the log-on and PDP context activation procedure, the SGSN will negotiate with the GGSN the PDP context for a particular network. However, at service activation, the subscriber station (i.e. the mobile station) does not have the possibility to flexibly indicate to the GPRS network which of his subscribed IPSs he would like to connect his session to.

Therefore, the object of the present invention is to provide a method, a switching device, a telecommunication system and a terminal station, which allow a GPRS subscriber a more flexible use of several external networks connected to the GPRS.

This object is solved by a method for data communications between a first terminal station of a mobile radio telecommunication network and a second terminal station of a packet data communication network, comprising the following steps:

a) sending a network indication parameter indicating a predetermined packet data communication network from said first terminal station to a switching device of said mobile radio telecommunication network to which a plurality of packet data communication networks are connected;

b) selecting an access means in said switching device providing an access to the packet data communication network indicated by said network indication parameter; and c) activating said selected access means to access a switching device of said indicated packet data communication network.

This object is further solved by a switching device for providing data communications between a first terminal station of a mobile radio telecommunication network and a second terminal station of one of a plurality of packet data communication networks connected thereto, comprising:

a) a reception means for receiving a network indication parameter indicating a predetermined packet data communication network from said first terminal station;

b) a plurality of access means each providing an access to one of said connected packet data communication networks;

c) a selection means for selecting an access means in accordance with said received network indication parameter; and d) a control means for activating said selected access means to access a switching device of said indicated packet data communication network.

This object is also solved by a telecommunication system for providing packet data communications between a first and a second terminal station thereof, comprising:

a) at least one mobile radio communication network to which said first terminal station is connected; and b) a plurality of packet data communication networks, said second terminal station being connected to one of said packet data communication networks; and c) said communication networks being connected to a switching device which comprises:
 c1) a reception means for receiving a network indication parameter indicating a predetermined packet data communication network from said first terminal station via said mobile radio communication network;
 c2) a plurality of access means each providing an access respectively to one of said connected packet data communication networks;
 c3) a selection means for selecting an access means in accordance with said received network indication parameter; and
 c4) a control means for activating said selected access means to access a switching device of said indicated packet data communication network.

This object is further solved by a terminal station of a mobile radio telecommunication network for packet data communications to a predetermined terminal station of a packet data communication network, comprising:

a) a network indication parameter memory means for storing a plurality of network indication parameters respectively corresponding to a packet data communication network connected to said mobile radio telecommunication network through a switching device;

b) a selection means for selecting a network indication parameter from said memory means indicating a packet data communication network to/from which said terminal station is to transmit/receive packet data; and c) a network request means for sending said selected network indication parameter to said switching device for requesting a connection to the packet data communication system indicated by said network indication parameter.

According to the invention, a network indication parameter is transferred to the SGSN which indicates the desired network, preferably during the PDP context activation procedure. The network indication parameter can be of a PDP type negotiated for the PDP context in the PDP context activation procedure. Thus, whilst the GPRS subscriber station was conventionally restricted to rely upon the SGSN to negotiate the appropriate network, according to the invention, any desired network can be prespecified during the PDP context activation or log-on procedure.

Further advantageous embodiments and improvements of the invention can be taken from the dependent claims. Hereinafter, the embodiments of the invention will be described with reference to the attached drawings. In the drawings, the same or similar reference numerals designate the same or similar elements or steps.

PRINCIPLE OF THE INVENTION

Figure 7:
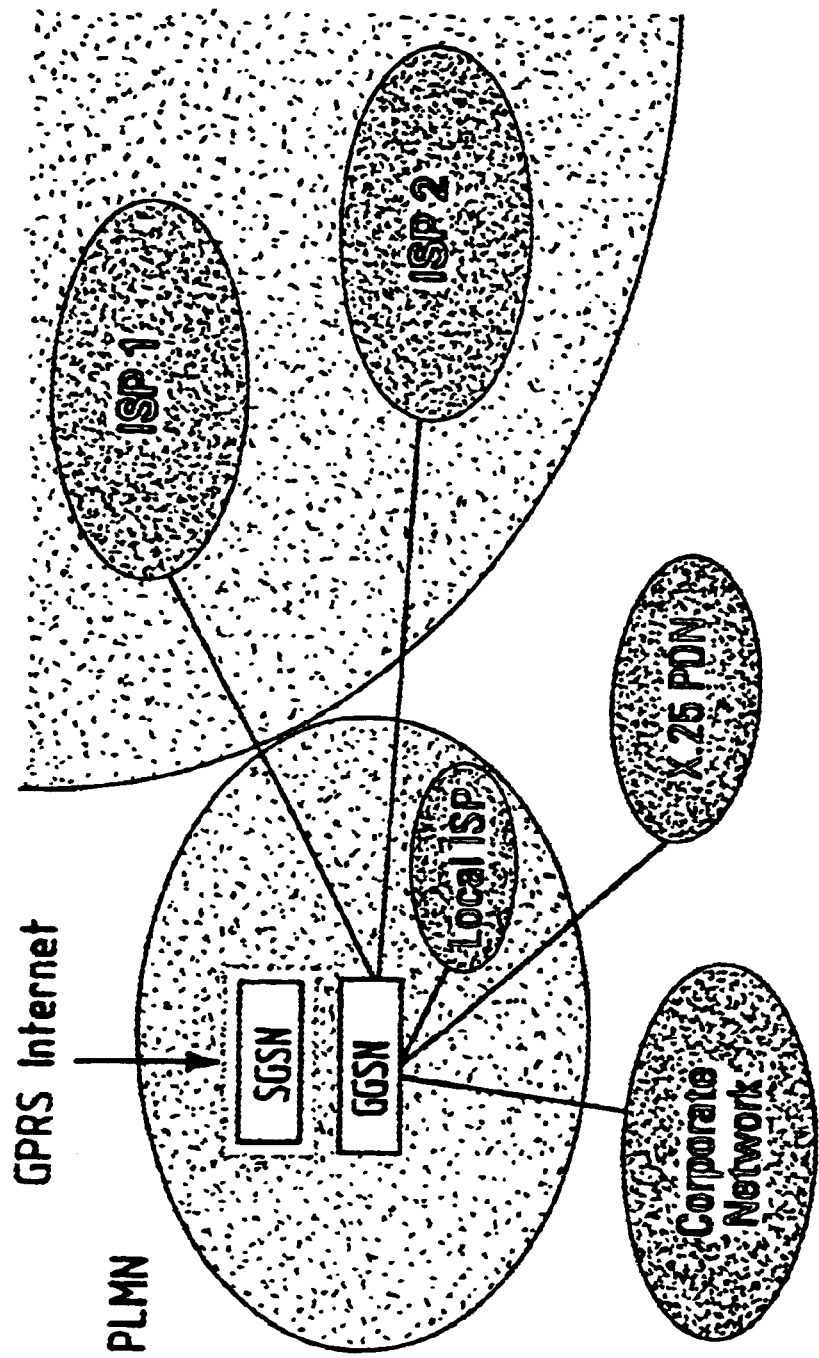
FIG. 7 shows a general overview of several networks (internet services providers, corporate network and X.25 PDN) connected to a GPRS system.
Figure 8:
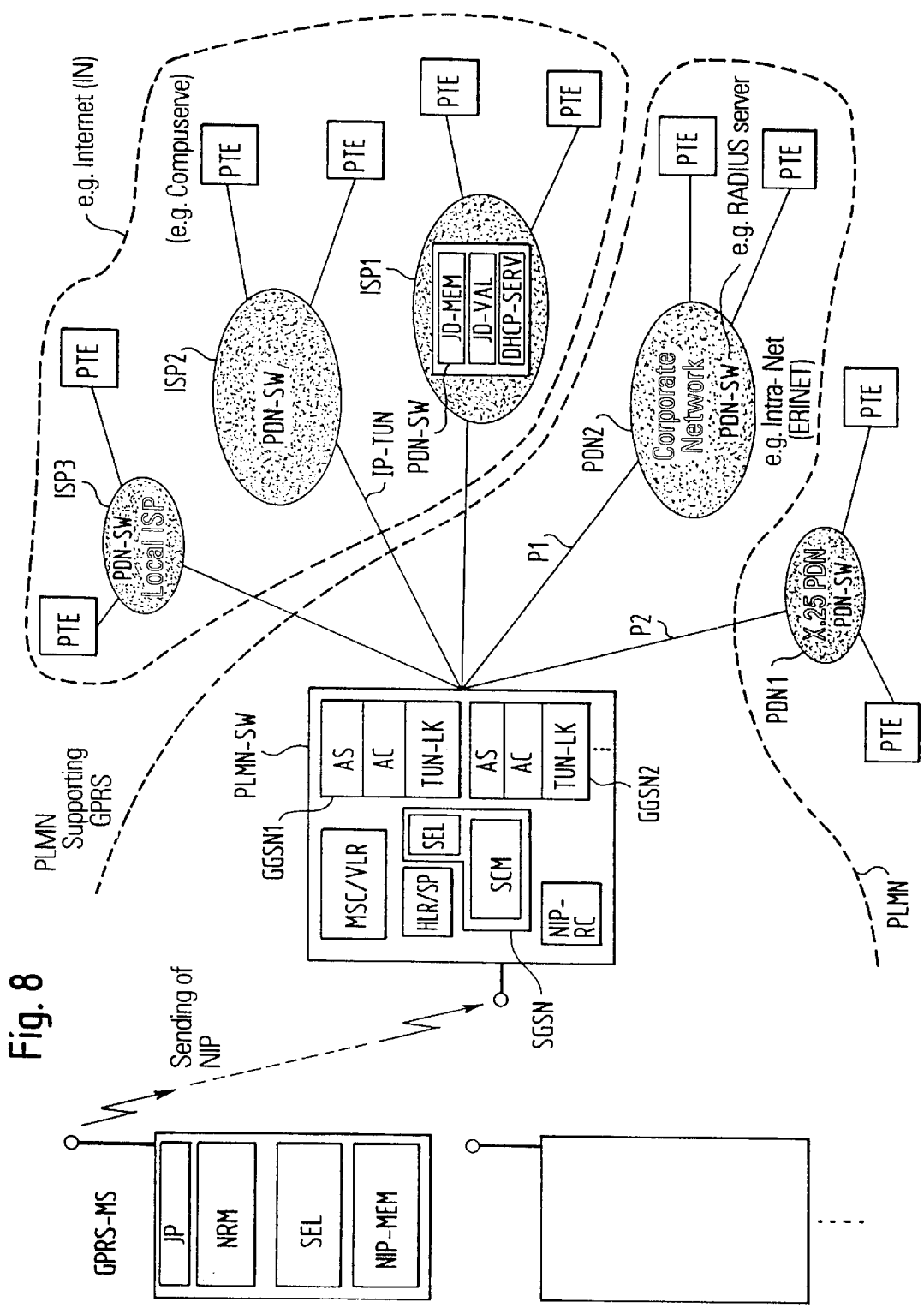
FIG. 8 shows a block diagram of a telecommunication system, a switching device PLMN-SW and a terminal station GPRS-MS according to the invention.

FIG. 8 shows a general overview of the telecommunication system according to the invention. FIG. 8 incorporates all interconnection and devices which are already shown in FIG. 1 to 4 and in particular in FIG. 7. Therefore, all descriptions made above for such interconnections and devices equally well apply to the interconnection and devices in FIG. 8.

Figure 1:
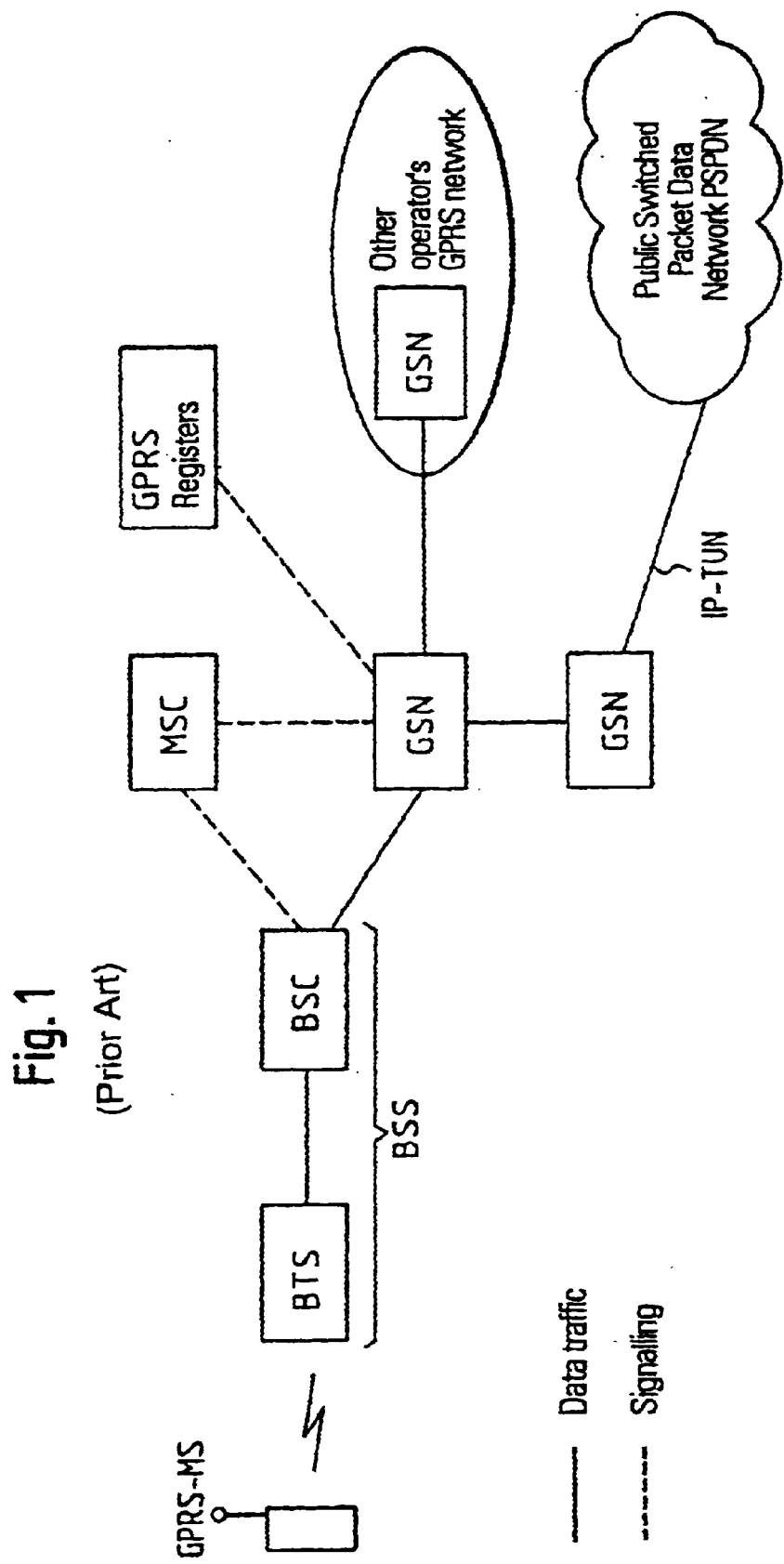
FIG. 1 shows the basic concept of a General Packet Radio Service GPRS.

For the purpose of the present invention, the mobile switching center/visitor location register MSC/VLR, the home location register HLR/SP of the mobile radio communication network PLMN (e.g. the PLMN A, PLMN B in FIG. 3) as well as the serving GPRS support nodes SGSN and the gateway GPRS support nodes GGSN (GGSN1, GGSN2 . . . ) serving as an access means form a general switching device PLMN-SW for a mobile radio communication network supporting a GPRS-system. As is also illustrated in FIG. 1, of course the GPRS support nodes GSNs can be located in the same PLMN or in different PLMNs.

As explained with reference to FIG. 2 and FIG. 7, each GGSN is provided to be connected to a respective packet data communication network, i.e. an internet IN, a corporate network PDN2 (e.g. an Intra-Network such as ERINET) or a X.25 PDN network PDN1. The interconnection between each access means (i.e. GGSN) is done through a tunnel or link to a respective switching device PDN-SW of the respective packet data communication network PDN1, PDN2, IN.

As illustrated in FIG. 8, a connection between the PLMN supporting GPRS and the internet IN can be made through a plurality of internet service providers ISPI, ISP2, ISP3, each comprising a respective switching device PDN-SW. Therefore, according to the invention, a plurality of packet data communication networks supporting packet data transmission can be connected to a PLMN supporting GPRS via the switching device PLMN-SW, in particular via the access means GGSN/AS.

The GPRS subscriber selection of a plurality of packet data communication networks is applicable to mobile radio communication networks supporting GPRS and having connections to many packet data communication networks (internet service providers/packet data communication network). As is shown in FIG. 8, a PLMN supporting GPRS is connected to many internet service providers ISPs either via the internet IN (e.g. using IP tunnels IP-TUN) or via dedicated connections P1, P2.

Although the technical realization of the interfaces and in fact of the interconnected packet data communication networks themselves is different at the interconnection point, regarding the necessity of the packet data transmission, there is no difference if the external network of the PLMN is an IP (internet protocol) based internet service provider (ISP) or an IP based corporate network PDN2 or an X.25 based packet data network PDN1. For example the interconnection point (the interface) Gi for an IP-based packet data communication network PDN1 is the Access Server AS within the gateway GPRS support node GGSN (within the respective access means of the switching device PLMN-SW) . Therefore, it should be understood that in FIG. 8 any kind of packet data communication network can be interconnected to a respective GGSN as long as it supports a packet data protocol PDP, e.g. IP or X.25.

As is also illustrated in FIG. 8, even the internet service providers ISP1, ISP2, ISP2 may themselves be considered as packet data communication networks containing a respective switching device PDN-SW. A plurality of terminal stations PTE are connected to the respective packet data communication networks PDN1, PDN2, IN. On the other hand, terminal stations GPRS-MS of the PLMN supporting GPRS communicate with a serving GPRS support node SGSN of the switching device PLMN-SW, as is already generally shown in FIG. 1, 2. Such terminal station GPRS-MS can be mobile stations of the PLMN supporting GPRS, e.g. a class A, B, C mobile station (see FIG. 2) or any other user application supporting a packet data transmission based on an IP.

Figure 3:
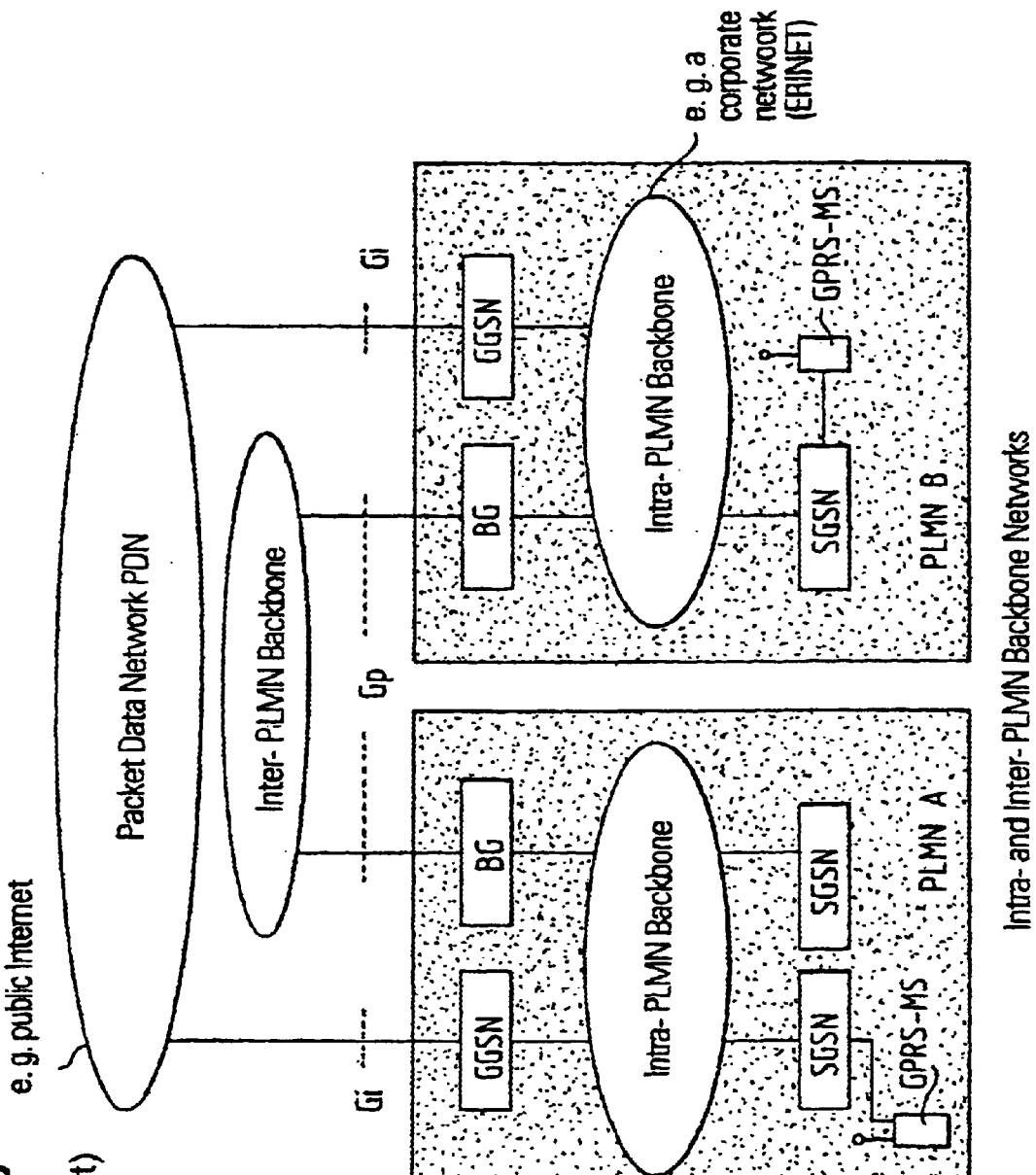
FIG. 3 shows the interconnection of intra- and inter-PLMN backbone networks connected to nodes of the GPRS system in FIGS. 1, 2.

Although FIG. 8 only shows one PLMN supporting GPRS, it should be understood that from FIG. 3 that also several PLMNs (PLMN A, PLMN B) each comprising a switching device similar to the switching device PLMN-SW with SGSNs and GGSNs may be provided together with further intra-nets or packet data networks or interconnection networks. Thus, the configuration in FIG. 8 should be seen completely analogous to FIG. 3 where a plurality of packet data communication networks (each including a respective switching device PDN-SW) are connected to a switching device PLMN-SW of a PLMN supporting GPRS. When intra-networks PDN2 or additional packet data networks PDN1 are provided, the communication link is provided through separate connections P1, P2, whilst the interconnection to internet service providers ISPs is made through internet protocol tunnels IP-TUN.

The mobile radio communication system PLMN is preferably a GSM-based radio communication system network such as a D1 or D2 network including a General Packet Radio Service GPRS system and said packet data transmission systems PDN1, PDN2, IN comprise a company internet PDN2 and/or an X.25 network PDN1 and/or an Internet protocol based network IN and/or a General Packet Radio Service GPRS based network.

Network Indication Parameters NIP

As shown in FIG. 8, the terminal station GPRS-MS of the mobile radio telecommunication network PLMN comprises a network indication parameter memory means NIP-MEM for storing a plurality of network indication parameters NIP respectively corresponding to a packet data communication network connectable to said mobile radio telecommunication network through the switching device PLMN-SW.

A selection means SEL for selecting a network indication parameter NIP from said memory means NIP-MEM is provided in said terminal station GPRS-MS for indicating a packet data communication network to/from which said terminal station wants to transmit/receive packet data. A network request means NRM of said terminal station GPRS-MS is provided for sending said selected networkindication parameter NIP to said switching device PLMN-SW in order to request a connection to the packet data communication system indicated by said network indication parameter NIP.

In addition to the devices already described in FIG. 1 to 4, the switching device PLMN-SW contains a reception means NIP-RC for receiving the network indication parameter NIP indicating the predetermined packet data communication network from the (first) terminal station GPRS-MS of the PLMNs. The SGSN communicating with the terminal station GPRS-MS contains a selection means SEL for selecting an access means GGSN/AS in accordance with said received network indication parameter NIP. As explained above, each GGSN serves as an access means for providing an access to one of said connected packet data communication networks PDN1, PDN2, IN. Within each access means, there is a control means AC for activating the access means to access a switching device PDNSW of the indicated packet data communication network, i.e. for establishing a connection with the respective (second) terminal station PTE of the desired packet data communication network.

A subscription memory means HLR e.g. provided in the home location register HLR stores subscription parameters SP indicating a subscription of the terminal station GPRS-MS to predetermined ones of said packet data communication networks. The subscription check means SCM provided in the SGSN compares the received network indication parameter NIP with said subscription parameters SP stored in said subscription memory means HLR. The control means AC only activates a selected access means AS for providing an access to the desired switching device PDN-SW of the respective packet data communication network, when said received network indication parameter NIP from the terminal station GPRS-MS matches one of the subscription parameters SP in said subscription memory means HLR.

Obviously, when the respective terminal stations have an access right to all possible packet data communication networks, the subscription check means SCM and the subscription memory means HLR need not necessarily be provided since the switching device PLMN-SW will always provide the packet data communication network indicated by a respectively sent network indication parameter.

Selection of the Packet Data Networks

Figure 9:
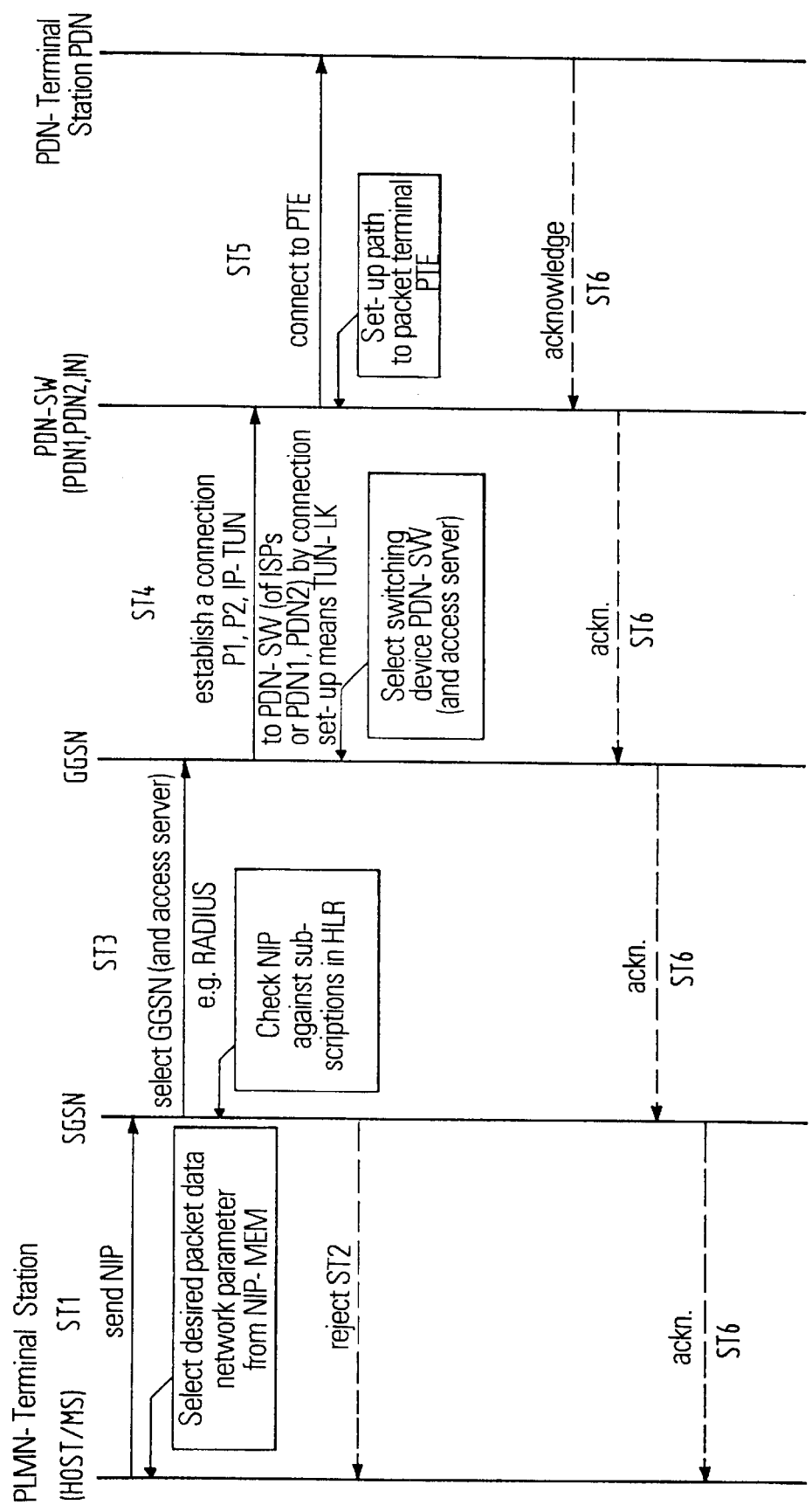
FIG. 9 shows a method according to the invention for selecting a packet data communication network in accordance with a network indication parameter NIP sent from a PLMN-terminal station.

A method for data communications between a (first) terminal station GPRS-MS of the mobile radio communication network PLMN and a (second) terminal station PTE of a packet data communication network PDN1, PDN2, IN according to the invention is shown in FIG. 9.

In FIG. 9, a PLMN terminal station (a mobile station GPRS-MS or any end-user application) selects a network indication parameter NIP from the memory means NIP-MEM. Preferably, the network indication parameter NIP does not only indicate the desired packet data communication network but also the type of session the terminal station intends to perform with the second station PTE of the packet data communication network. For example, the network indication parameter NIP can indicate the intra-network (corporate network) PDN2, i.e. NIP=ERINET for a DELTA Access. Likewise, the network indication parameter NIP can indicate AoL for an e-mail session. All such network indication parameters can be realized via a PDP-type parameter as will be explained further below (details of the PDP-type context are explained above and are referenced in the GSM 03.60 proposed version 2.0.0 document by ETSI).

When the desired network indication parameter (and possibly the type of communication) NIP has been selected from the network indication parameter memory means NIP-MEM, the network request means NRM sends the NIP in step ST1 to the switching means PLMN-SW, preferably to the SGSN. Assuming that the first terminal station GPRS-MS does not have an access right automatically to all packet data communication networks, SGSN will check whether or not the indicated network, i.e. the chosen packet data communication network, is subscribed to. Therefore, the subscription check means SCM compares the received network indication parameter NIP with the subscription parameters SP stored in the subscription memory means HLR.

In step ST2, a rejection indication can be transmitted to the first terminal station in case no valid subscription parameter SP is found in the subscription memory means HLR which would match the received network indication parameter NIP. Such a reject procedure using PDP-type parameter can e.g. be established via a PDP-reject procedure as described in the GSM 03.60 proposed version 2.0.0.

If the terminal station GPRS-MS has a valid subscription to the packet data communication network indicated by the network indication parameter NIP, the selection means SEL in step ST3 selects an appropriate GGSN to which the desired packet data communication network is connected. That is, the SGSN will select an address for the appropriate GGSN in step ST3. A control means AC in the selected GGSN (the access means) selects an appropriate access server AS for building up a connection to the desired switching device PDN-SW of the packet data communication network.

When the appropriate access server included in the GGSN has been selected and activated, the GGSN establishes a connection to the switching device PDN-SW (e.g. the internet service provider IPS) in step ST4, e.g. the GGSN will use a RADIUS server towards the ISP1. The ISP or the respective switching device PDN-SW in the packet data communication network then establishes a connection to the desired packet terminal station PTE in step ST5. Before a communication between the PLMN terminal station and the PDN terminal station PTE takes place, acknowledgment messages can be returned as indicated in step ST6.

Using the selection and transmission of a specific parameter NIP indicating the desired packet data communication network, any one of the packet data communication networks PDN1, PDN2, IN (or respectively providers ISP3, ISP2, ISP1 thereof) can be selected for a packet data communication between the two terminals GPRS-MS, PTE. Thus, it is possible to connect a large number of IPSs to a GPRS-GSM network since the subscription station has the possibility to indicate to the GPRS network to which of the subscribed IPSs it would like to connect its session to.

As will be appreciated, any kind of network indication parameter NIP may be selected and sent to the switching device PLMN-SW of the PLMNs supporting GPRS. Preferably, an already existing (i.e. standardized and agreed) parameter, i.e. the aforementioned "PDP-type" parameter) parameter can be used therefor, in order to allow the terminal station GRPS-MS to select the specific ISP or the specific packet data communication network. The use of the PDP-context and the PDP-types are explained in the GSM 03.60 proposed version 2.0.0.

Figure 6:
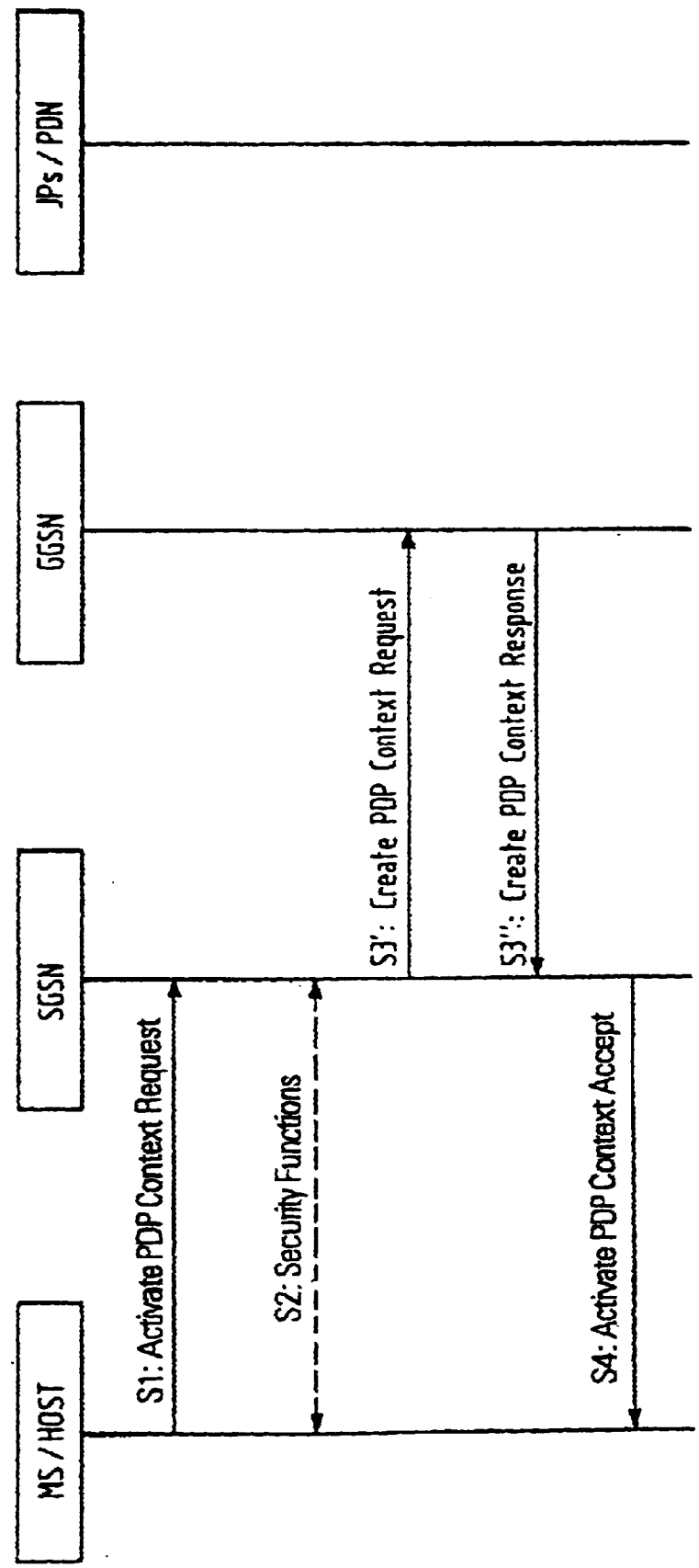
FIG. 6 shows a conventional PDP context activation procedure to establish the PDP context parameter table for establishing a tunnel between the GPRS mobile station MS and the packet data network.

That is, in the present invention, each network operator has the possibility to map one ISP to one "PDP-type" parameter and thereby indicate which ISP or packet data communication network the particular terminal stations GPRS-MS can connect to. The use of the "PDP-type" parameter will be able to distinguish up to 64,000 ISPs (i.e. 64,000 different kinds of packet data communication networks). The "PDP-type" parameter can be communicated to the switching device PLMN-SW during the PDP-context activation procedure (see FIG. 6) as will be further explained below with reference to FIG. 11.

Registering a New Subscription Request

Furthermore, it should be noted that the terminal station GPRS-MS can comprise request means for making a request to the switching device PLMN-SW of the PLMNs for requesting a subscription (access right parameter) to a new packet data communication network supported by the PLMN/GPRS system, to which however the terminal station GPRS-MS did not have an access right before. When receiving such an access request from the terminal station GPRS-MS, the SGSN can perform a registering routine for registering an access right (subscription) to the indicated network in the subscription memory means HLR. The charging for the use of the packet data communication network can then be carried out through the SGSN or the GGSN responsible for the indicated packet data communication network.

Figure 2:
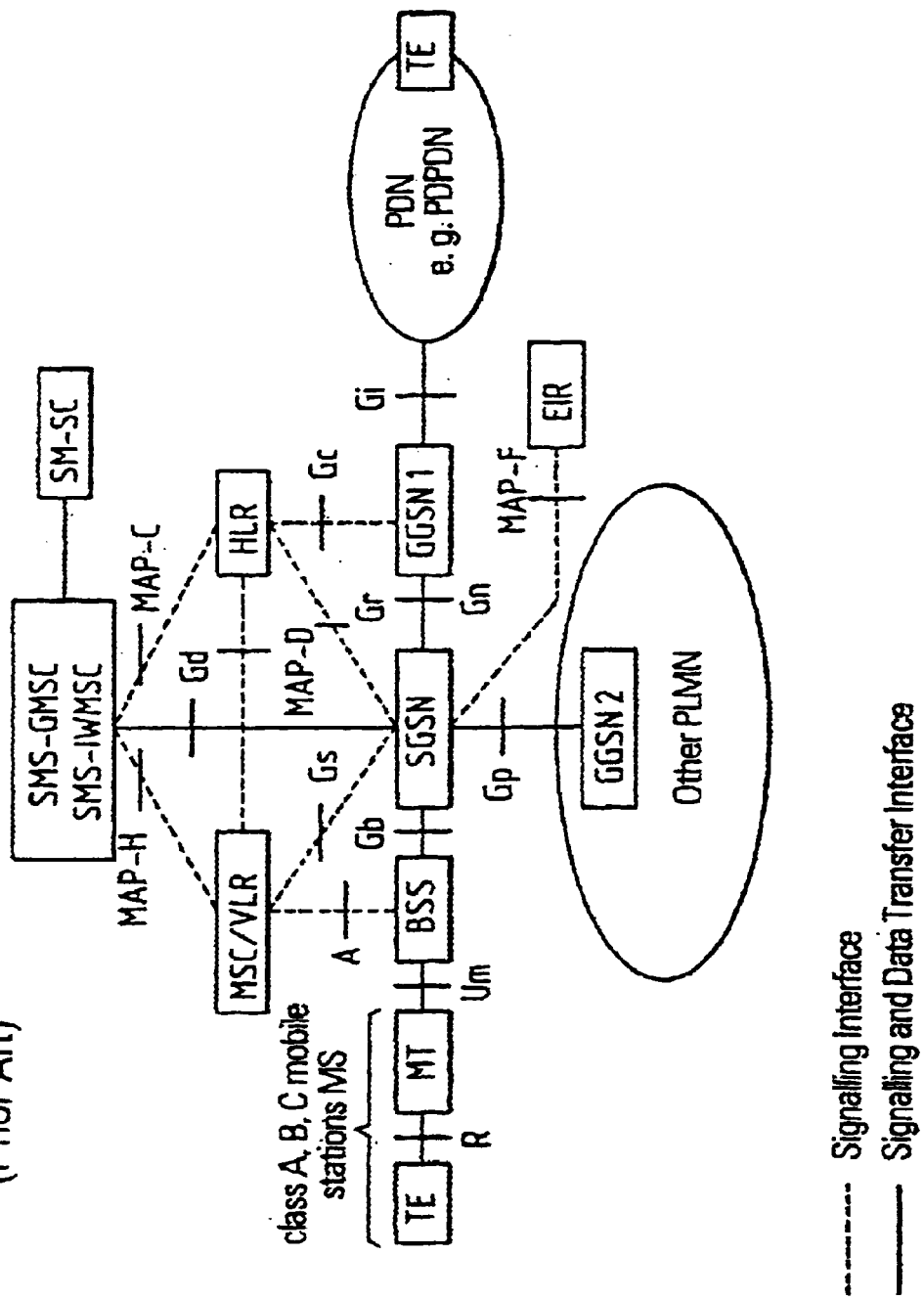
FIG. 2 shows the basic interconnection of nodes and networks in the GPRS system of FIG. 1.

Alternatively whenever the subscription check means SCM receives a network indication parameter NIP from GPRS-MS for which no registration is found in the subscription memory means HLR, the subscription check means can perform not only a rejection procedure as in step ST2 in FIG. 2, but the subscription check means SCM can also execute a registering procedure for registering a new subscription parameter in the subscription memory means HLR. In the registering procedure, the subscription check means will inquire whether the GPRS-MS wants to subscribe to the packet data communication network indicated by the network indication parameter NIP, and if this is so, then the new registration is recorded as a valid subscription parameter in the subscription memory means HLR. During the registration procedure, other services may be carried out, i.e. the transmission of special advertisements, special charges or other information which the network operator of the indicated packet data communication network desires to transmit to a new terminal station GPRS-MS. In this case the SGSN and the GGSN may already perform a communication in order to transmit this information from the switching device PDN-SW of the packet data communication network to the GPRS-MS.

Whilst the above explanation generally holds for any packet data communication network, hereinafter, embodiments of the invention will be described for the specific case of an internet service provider ISP/Packet Data Network PDN selection, wherein the PDP-type parameter will be used as network indication parameter NIP.

ISP/PDN Selection Using a PDP-type Parameter

Figure 10:
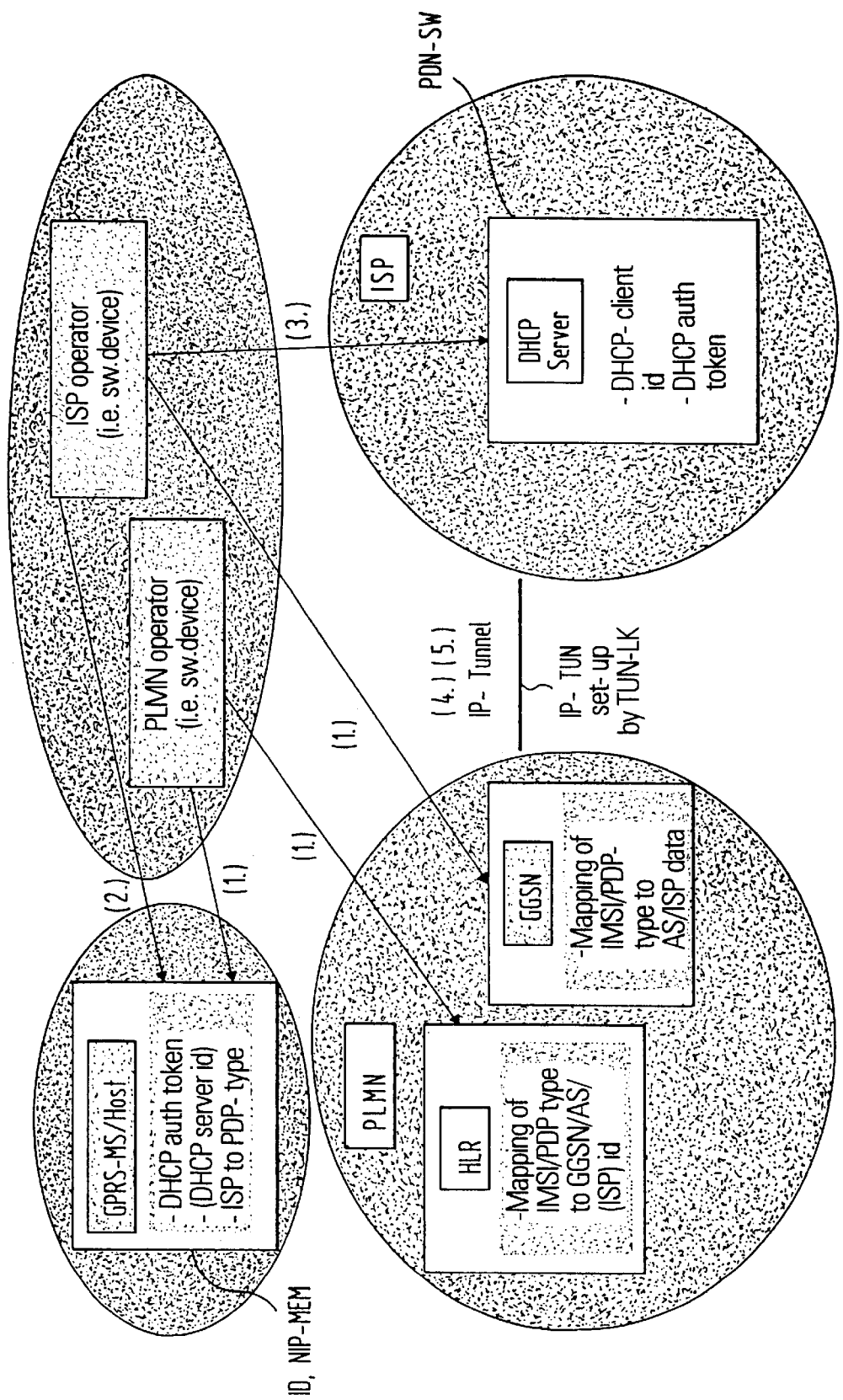
FIG. 10 shows the mapping of network indication parameters and identification parameters for setting up an IP-communication tunnel between a GPRS-MS/host station and a DHCP-server of an internet service provider ISP using a PDP type parameter.

As is indicated in FIG. 10, certain requirements must be fulfilled in the terminal station GPRS/MS (or the host station), the switching device PLMN-SW and the ISP/PDN to connect the terminal station GPRS-MS to an ISP (i.e. its respective switching device PDN-SW) via a GPRS system.

1. As already explained above in detail, the GPRS/MS-Host Terminal Station must have a valid subscription to at least one PDP-type provided by the PLMN switching device (operator) in the home location register HLR (i.e. the subscription parameter memory means). That is, the subscriber stations SIM card needs to be valid for the respective packet data communication network.

2. For Internet Protocol (IP) based data communication networks (ISPs) the terminal station (GPRS-MS or host) must further have assigned a DHCP authentication token (and preferably an encryption key) provided by the packet data communication network (ISP). That is, additionally to the valid network identification parameter (SP) in the HLR, the terminal station GPRS-MS preferably comprises an identification means ID for sending an identification parameter like the DHCP authentication token (and preferably an encryption key) to the switching device PDN-SW of the desired packet data communication network ISP1 (Internet IN). This will indicate that the GPRS-MS is capable of setting up a suitable communication protocol to the DHCP-server/RADIUS server of the desired network (DHCP= Dynamic Host Configuration Protocol).

Only when an identification validation means ID-VAL in the switching device PDN-SW determines a matching between the received identification parameter and one of the plurality of identification parameters stored in an identification memory means ID-MEM provided in said switching means PDN-SW, the communication link set-up means TUN-LK sets up the communication link (or communication tunnel IP-TUN).

3. Whilst the GPRS-MS host must have stored the DHCP authentication token and preferably the DHCP server identity (of the DHCP-server of the switching device PDN-SW of the desired packet data network) as well as the relationship between the PDP type and the desired ISP, corresponding information is available in the DHCP-server/RADIUS server (the access means in the respective packet data network) for key resolution. Thus, the PDN-SW also contains the DHCP-user identification and the DHCP authentication token as is illustrated in FIG. 10.

Preferably, for IP-based packet data communication networks ISPs the respective access means (DHCP server) in the switching device PDN-SW can be updated with the international mobile station identity (IMSI) as mobile station/host (terminal station) identification option. That is, if the terminal station is a mobile station supporting GPRS (such as a class A, B, C mobile station), the access server (DHCP server) of the packet data network switching device PDN-SW always receives the current international mobile station identity.

4. The PLMN switching device PLMN-SW needs to set-up a communication link or tunnel to the ISP, possibly through the firewall of the ISPs for RADIUS information (for internet protocol based ISPs only). The building up of the IP tunnel by the communication link set-up means TUN-LK is performed via an exchange of tunnel management messages, i.e. a PDP-context procedure as referred to in the draft TS100960 proposed V1.1.0 by ETSI.

5. All switching units and routing devices in the IP-tunnel (path) between the GPRS-MS/Host and the access means (DHCP-server of the ISPs) must support IP multicast in order to forward DHCP broadcast messages (for IP-based ISPs only).

That is, features 1 to 5 on the one hand determine which packet data communication system (ISP) should be connected via a communication link to the GPRS-MS and on the other hand they allow to dynamically configure a protocol with the host if the identification parameters (DHCP-id and the ISP-id and the DHCP-authentication token) match those provided by the switching device PDN-SW (the DHCP-server).

Therefore, as shown in FIG. 10, the GPRS-MS host must provide the DHCP authentication token and preferably the DHCP server identity as well as the relationship between the desired ISP and the PDP-type parameter. The HLR must provide the mapping of the IMSI-PDP-type parameter and the GGSN/AS/(ISP)-id, i.e. the selection of the appropriate GGSNs and access server AS corresponding to the desired packet data network. The GGSN must provide the mapping of the IMSI/PDP-type parameter to the access server AS/ISP data. Finally, the DHCP-server should likewise store the DHCP-client identity and the DHCP authentication token to allow a mutual recognition of the GPRS/MS/host and the selected switching device PDN-SW and the setting up of a suitably configured protocol for communication between them.

Selection of the Access Server Using a PDP-type Context Activation

Figure 11:
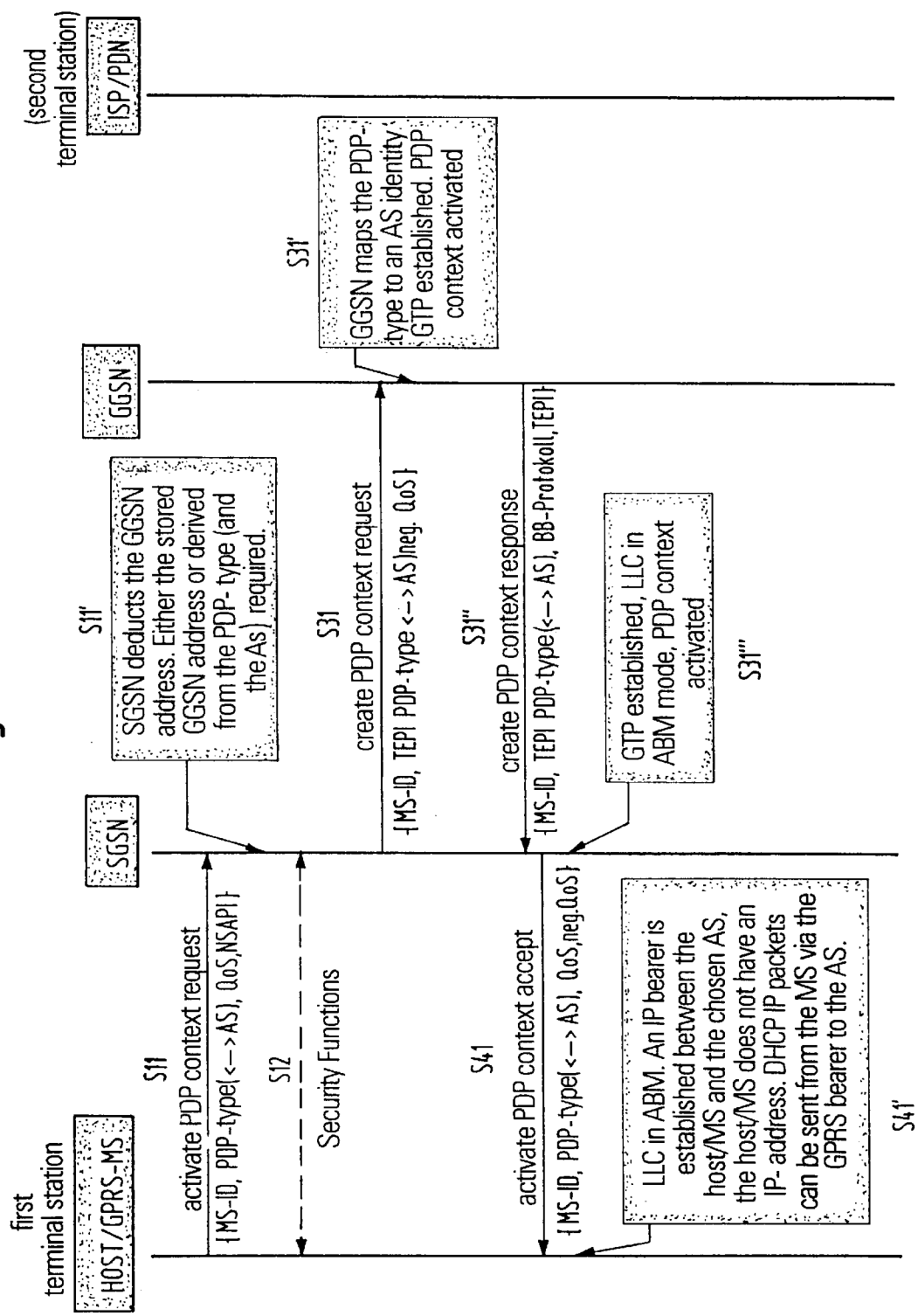
FIG. 11 shows a PDP context activation procedure using a PDP-type parameter for selecting a particular packet data communication network.

The differences between a conventional circuit switched access to an ISP/PDN and the selection of an access server based on the PDP-type parameter at PDP context activation at the SGSN becomes particularly obvious when considering FIG. 11.

First, it should be understood that already in conventional circuit switched accesses to ISP/PDNs the terminal station has the possibility to choose the desired ISP (Internet Service Provider) and the access server conventionally by means of the called party number. Different ISPs simply have different access numbers, such that different access servers like COMPUSERVE, T-ONLINE etc. can be selected by the terminal station by simply dialing the appropriate number. Even in a circuit switched GSM Internet access function the selection of the appropriate access server is performed via the sending of the appropriate called party number (CPN).

According to the invention, the selection of the access server in the PLMN-SW (i.e. the appropriate access server in the GGSN) is based on the PDP-type parameter at PDP-context activation at the SGSN, as already broadly described in FIG. 9. FIG. 11 can be seen as an extension of the conventional PDP-context activation procedure shown in FIG. 6 known from the above cited GSM TS100960 proposed 1.1.0 and the GSM 03.60 proposed version 2.0.0 documents. Therefore, the procedure in FIG. 11 should be seen in the context of the general PDP context activation procedure of FIG. 6.

In step S11 an activate PDP context request message is sent from the first terminal station (Host/GPRS-MS) to the serving GPRS support node SGSN. Step S11 corresponds to Step S1 in FIG. 6, however, contains a different parameter list as is indicated in FIG. 11. Apart from other parameters already conventionally necessary in the PDP context request in step S1 in FIG. 6, the activate PDP context request message in step S11 in FIG. 11 contains the network indication parameter NIP, namely the "PDP-type(<->AS)" parameter. Into the brackets <-> the selection means SEL of the terminal station GPRS-MS inserts the network indication selected from the network indication memory NRM. Thus, <-> indicates "X.25 PDN, ERINET, ISP1, ISP2, ISP3" and the entire network identification parameter e.g. PDP-type (X.25 AS) then indicates the requesting of the X.25 PDN network or more specifically the access server AS of the X.25 network. Preferably, the PDP context request contains the usual parameters MS-ID (Mobile Station Identity), QoS (requested Quality of Service) and the NSAPI (Network Layer Service Access Point Identifier). Step S12 corresponds to step S2 in FIG. 6.

In step S11' the SGSN derives the appropriate GGSN address of the GGSN which serves the desired packet data network (see for example FIG. 2). Of course, before proceeding with Step S11' the SGSN checks the NIP against the subscriptions in the HLR. There are two possibilities how the SGSN deducts the GGSN address in step S11'. Either the stored GGSN address is used or the derived GGSN address from the PDP-type (and the AS) required is used. After step S11' the SGSN knows to which GGSN it must send the create PDP context request in step S31.

Apart from the conventional parameters of MS-ID and neg.QoS (negotiated Quality of Service which has been agreed between the first terminal station and the SGSN) the inventive create PDP context request contains the parameter "TEPI PDP-type (<-> AS)". It now contains the terminal point identifier TEPI indicating the identification of the access point of the terminal station TE (GPRS-MS).

In step S31' the GGSN which receives the create PDP-context request message maps the PDP-type to an access server AS identity. That is, the GGSN for example recognizes that the access server AS dedicated to the X.25 PDN needs to be activated due to the contents of the PDP-type parameter. The GGSN is the final connection point of the PLMN supporting GPRS and thus sets up a connection to the second terminal station (the ISP/PDN switching device PDN-SW and its connected terminal station PTE). Therefore, in step S31' the GPRS tunneling protocol GTP is established in order to build up the path or the IP tunnel by the communication link set-up means provided in the GGSN (see the IP-tunnel in FIG. 10). At the end of step S31' the PDP context is activated.

Therefore, in step S31" the create PDP context response is sent to the SGSN from the GGSN. The create PDP context response now contains—apart from the parameters in step S31—the BB protocol and the TEPI of the terminal station PTE. In step S31'" the GPRS tunneling protocol GTP is established, the logical link control LLC is set in the ABM mode and the PDP context is activated.

In step S41 the activate PDP context accept message is transferred to the first terminal station from the SGSN. Since the SGSN knows which first terminal station has sent the activate PDP context request message in step S11, the activate PDP context accept message in step S41 does not contain the TEPI information. It contains the MS-ID, the requested QoS, the negotiated QoS and the network identification parameter PDP-type(<->AS).

The situation after step S41 corresponds to the acknowledgment message in step ST6 in FIG. 9 at the PLMN-terminal station. As explained with reference to FIG. 9 above, after step S41 the bearer service is set up, since the desired packet data network or internet service provider is selected and a protocol and the appropriate servers have been selected. In Step S41' the logical link control LLC is set in the ABM mode. An internet protocol (IP) bearer is set up between the host/GPRS-MS and the selected access server AS although the host/GPRS-MS does not have an IP address. Now, DHCP IP packets can be sent from the GPRS-MS/host via the GPRS bearer to the desired access server AS in the GGSN which relays the packets to the appropriate switching device PDN-SW in the packet data network or internet server provider.

Figure 4:
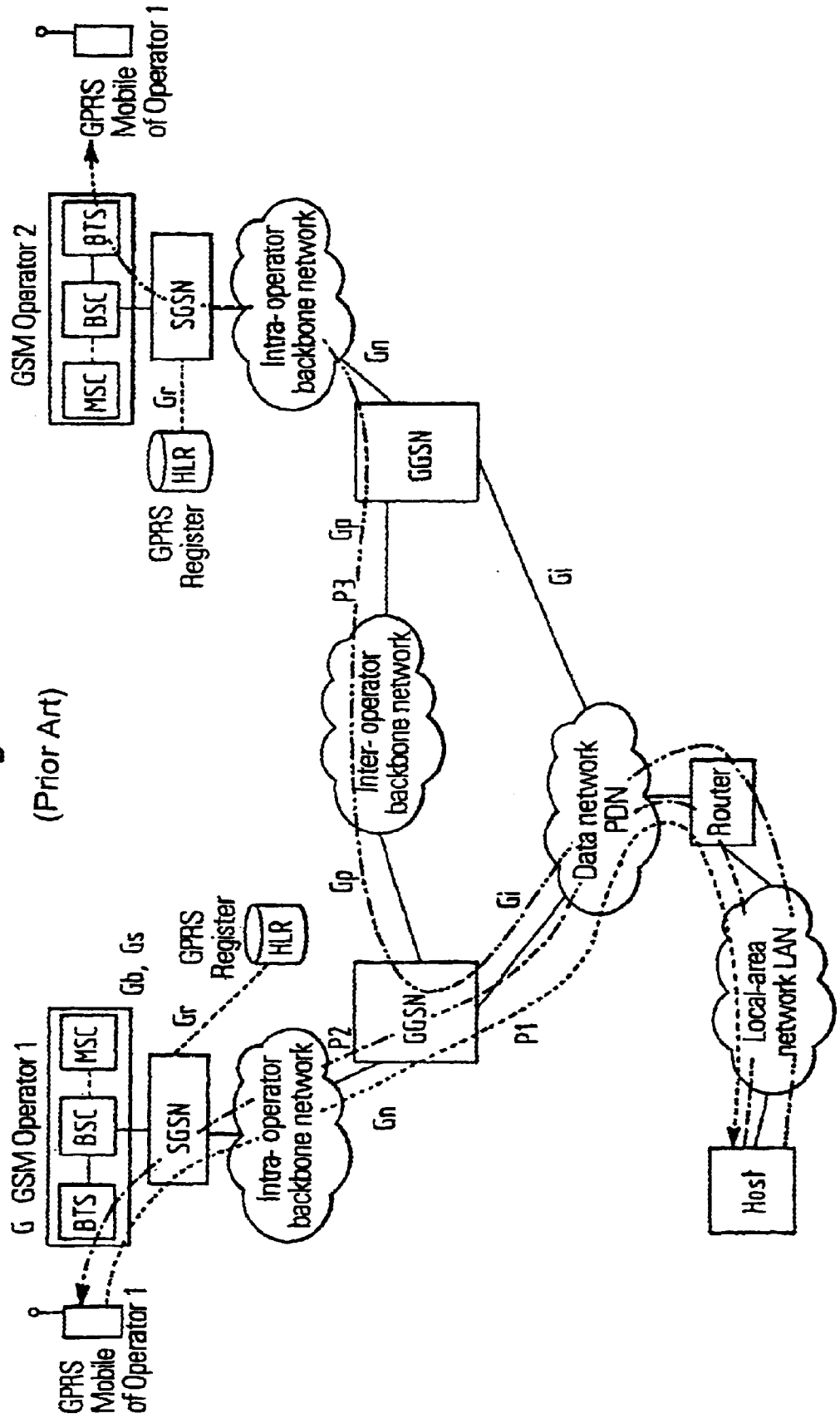
FIG. 4 shows the possibilities of a packet transmission between a GPRS mobile station and a host when the mobile station requests the transmission (P1), when the host requests the transmission (P2) and when the mobile station has roamed to the network of another GPRS operator (P3)
Figure 5:
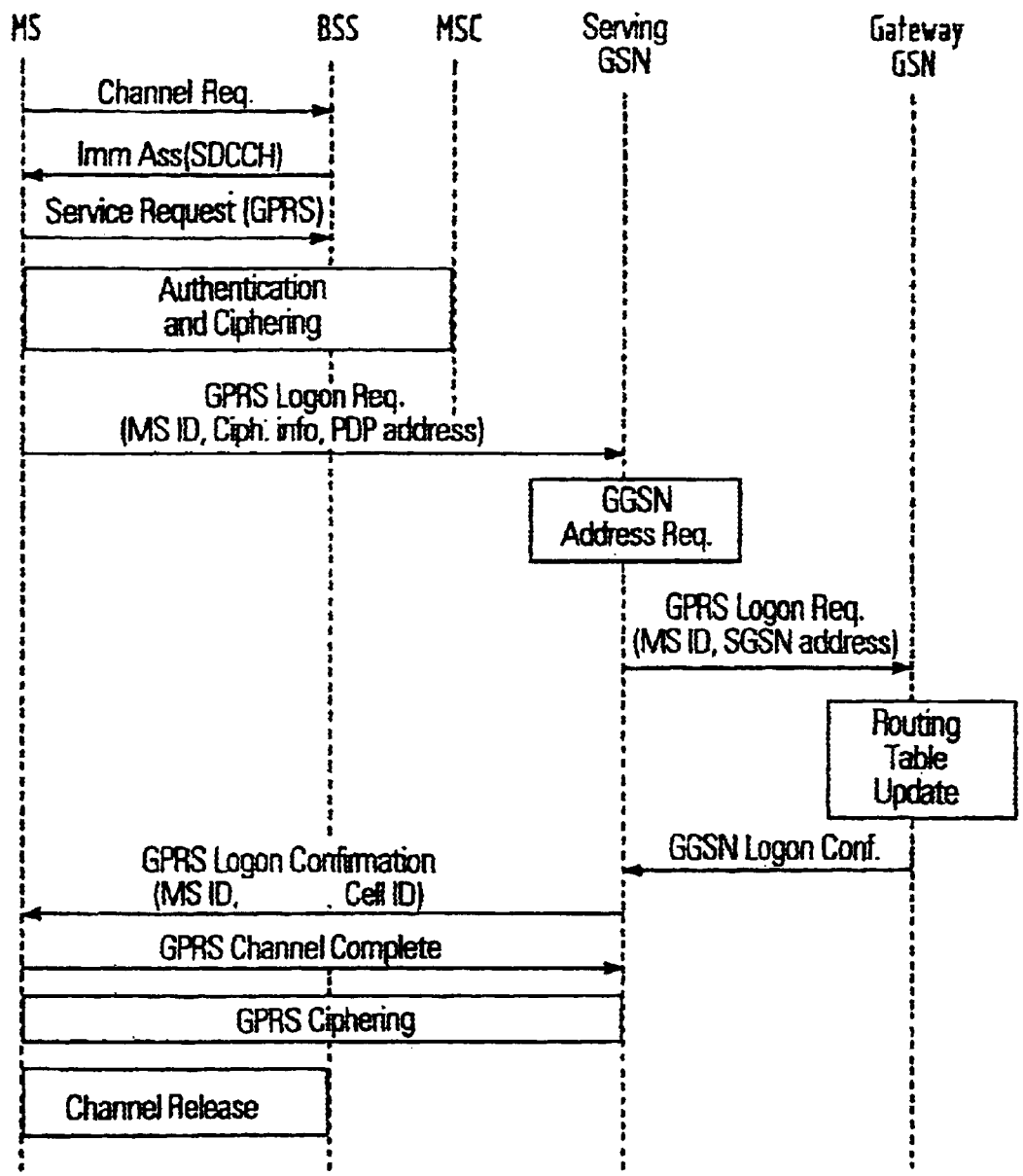
FIG. 5 shows a typical log-on procedure of a GPRS mobile station to the gateway GSN of the GPRS system shown in FIG. 1 to 4.

It should be noted that of course the PDP context activation procedure in FIG. 11 applies to the setting up of the IP tunnels to internet service providers as well as to the setting up of communication links P1, P2, P3 generally (as is seen in FIGS. 4, 8, 10).

Embodiment of the PDP-type Parameter

Figure 12:
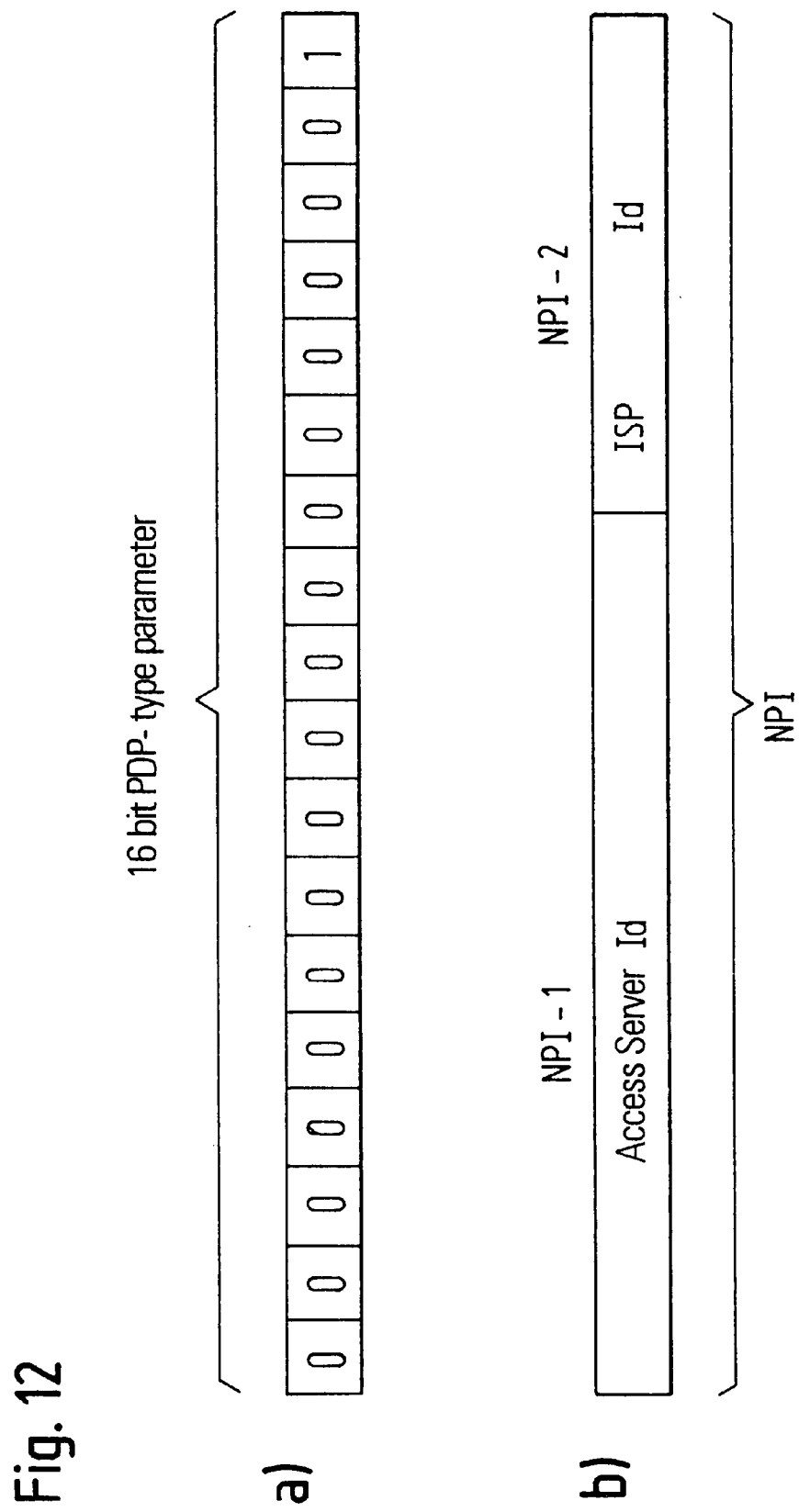
FIG. 12 shows an embodiment of the network indication parameter NPI.

As shown in FIG. 12, preferably the PDP type parameter is a 16-bit parameter whose interpretation is as follows:

0 IP, default interworking network (e.g. the inter-PLMN backbone network shown in FIG. 3, FIG. 4);

1 X.25 , default interworking network;

2–99 reserved to be interpreted as "IP, default interworking network" by this version of the protocol;

100–12000 PLMN specific interworking network;

12001–64 k reserved for future use.

Of course other interpretations of the 16-bit PDP parameter can be made and the above definition only applies to a preferred embodiment of the invention. The PDP type parameter can also have a different length rather than 16-bit. In FIG. 12A the X.25 default interworking network has been specified in the PDP-type parameter.

Selection of ISP (Internet Service Providers)

As explained above, the normal case in a circuit switched access is that the selection of the ISP (Internet Service Provider) is made by the access server and is based on the user identity (user-id) received together with the DHCP authentication as the identification parameter. Therefore, the identification parameter indicates the domain name of the ISP. For example, the DHCP authentication may conventionally be e.g. www.ericsson.se. The latter part of such an DHCP authentication indicates the domain name of the ISP, here "ericsson.se". Conventionally, the access server AS will check the ISP domain name with its RADIUS configuration data to determine the ISP tunnel (i.e. the communication link)

As explained above with reference to FIG. 11, according to the present invention the selection of the ISP in a GPRS environment is done differently. As also indicated in FIG. 12, for "PLMN specific interworking networks" the network indication parameter, i.e. PDP-type parameter, can preferably be interpreted as consisting of two sub-fields:

a first indication field NPI-1 containing the "access server identity" and a second indication field NPI-2 contains the "internet service provider identity".

As explained above, special subscription parameters (data) is stored in the subscription parameter memory HLR. Therefore, according to another embodiment of the invention, the access possibilities for particular GPRS-MSs can be restricted to only a sub-number of possible ISPs. Preferably, the HLR subscription data is set by the switching device PLMN-SW in order to define closed user groups for company local area networks (LANs), such that an access of external terminal stations to access a company LAN is restricted, i.e. that a massive load on the RADIUS server of that particular company packet data network is avoided.

Each PLMN switching device (operator) defines which PDP type parameter identifies which internet service provider ISP, for example (see FIG. 12a): "100=AoL", "101=COMPUSERVE", "102=ERINET", "103=T-ONLINE" etc.

Thus, whilst the PDP-type parameter contains the same indication or identity for the desired access server, an eventual connection to the desired packet data communication network is only made when also the ISP identity matches one contained in the HLR subscription data. Thus, by using two separate fields in the PDP-type parameter, a two stage grouping of terminal stations can be achieved.

As explained above, the usage of an already existing (i.e. standardized and established) parameter, i.e. the PDP-type parameter allows the terminal station of the PLMN supporting GPRS to select a specific ISP. Each network operator has the possibility to map one ISP to one "PDP-type parameter" and can thus indicate which ISP the terminal stations can connect. Using a 16-bit PDP-type parameter up to 64000 ISPs can be connected to. Thus, a large number of ISP (Internet Service Providers) can be connected to a GPRS network allowing a more flexible use of internet service providers for the GPRS network.

Modified PDP-parameters for Use of Several Networks Parallely

According to another embodiment of the invention, the PDP-type parameter can also be modified such that the terminal station GPRS can request an access to two or more packet data communication networks PDN1, PDN2 simultaneously. In this case, the PDP-type parameter will contain two entries, each defined as in FIG. 11. The SGSN will then select two or more appropriate GGSNs and two communication links will be set up simultaneously. Due to the packet nature of the PLMN supporting a GPRS system, the terminal station GPRS-MS can therefore simultaneously communicate with two terminal stations PTE of two separate packet data communication networks which have been requested through the transmission of a specific two-stage PDP-type parameter.

INDUSTRIAL APPLICABILITY

As explained above, the method, switching device, telecommunication system and the terminal station according to the invention allow users of a PLMN network which supports GPRS features to link up to a desired arbitrary packet data network, namely to use a number of different internet service providers, cooperate networks, etc. The invention can be applied to any PLMN-system supporting features of a packet radio service and is thus not restricted particular to the use in a GSM-system supporting GPRS according to the present ETSI standards.

Furthermore, the invention is not restricted to the specific preferred embodiments described herein and a person skilled in the art can perform modifications and variations of the invention within the scope of the attached claims. In these claims, reference numerals only serve clarification purposes and do not limit the scope of these claims.

What is claimed is:

1. A method for providing packet data communications between a first terminal station and a second terminal station of a telecommunication system, the telecommunication system comprising:

at least one mobile radio telecommunication network with which the first terminal station is connected; and a plurality of packet data communication networks wherein the second terminal station is connected to one packet data communication network via a communication path; and wherein said packet data communication networks are respectively connected, through a communication tunnel, with a switching device including:

a reception device;

a plurality of access devices each providing an access to one of said connected packet data communication networks and each including a communication tunnel set-up device for setting up a respective communication tunnel between said access device and a respective switching device of the respective packet data communication network;

a selection device for selecting one of said access devices; and a control device in each access device;

the method comprising the steps of:

sending a network indication parameter indicating a predetermined packet data communication network from said first terminal station to said switching device of said mobile radio telecommunication network;

receiving, by said reception device of said switching device, said network indication parameter;

selecting, by said selection device, the access device in accordance with the network indication parameter; and activating, by said control device, of the communication tunnel set up device provided in said selected access device; and setting-up, by said communication tunnel set-up device, of a communication tunnel to said respective switching device of the packet data communication network connected to said selected-access device when said access device is selected by said selection device.

2. The method according to claim 1, wherein after receiving said network indication parameter (NIP) said network indication parameter is compared with subscription parameters stored in a subscription memory device and said selection and activation of said access device only takes place when said received network indication parameter matches one the subscription parameters in said subscription memory device.

3. The method according to claim 1, wherein the first terminal station of the mobile radio telecommunication network sends an identification parameter to said switching device of said packet data communication network and said communication tunnel set-up device sets up said communication tunnel only when a validation device provided in said switching device of said packet data communication network determines a matching between said received identification parameter and one of a plurality of identification parameters stored in a identification memory device provided in said switching device.

4. The method according to claim 1, wherein said network identification parameter further indicates the data communication type.

5. The method according to claim 1, wherein the mobile radio telecommunication network is a GSM-based radio communication network and the packet data communication networks comprise one of a company intranet, a X.25 network, an internet protocol based network, and a General Packet Radio Service (GPRS) based network.

6. The method according to claim 5, wherein said network indication parameter is a parameter which is transmitted to the switching device of said mobile radio communication network when a PDP Context Activation Procedure is performed in said GPRS system.

7. The method according to claim 3, wherein the mobile radio telecommunication network is a GSM-based radio communication network and the packet data communication networks comprise at least one of a company intranet, a X.25 network, an internet protocol based network, and a General Packet Radio Service (GPRS) based network; and said switching device of said packet data communication network is an Internet Service Provider and said access device is a DHCP-Server of said Internet Service Provider.

8. The method according to claim 3, wherein the mobile radio telecommunication network is a GSM-based radio communication network and the packet data communication networks comprise at least one of a company intranet, a X.25 network, an internet protocol based network, and a General Packet Radio Service (GPRS) based network; and said identification parameter is sent to a DHCP-Server of an Internet Service Provider.

9. A switching device for providing packet data communications between a first terminal station of a mobile radio telecommunication network and a second terminal station of one of a plurality of packet data communication networks wherein the second terminal station is connected to one of said packet data communication networks via a communication path; and wherein said packet data communication networks are respectively connected, through a communication tunnel, the switching device which includes;
   a reception device adapted to receive a network indication parameter, indicating a predetermined packet data communication network, from said first terminal station;
   a plurality of access devices each adapted to provide an access to one of said connected packet data communication networks; wherein
      each access device includes a communication tunnel set up device for setting up a respective communication tunnel between said access and a respective switching device of the respective packet data communication network;
   a selection device adapted to select one of said access devices in accordance with the network indication parameter; and wherein
      a control device is provided in said access device adapted to activate the communication tunnel set up device provided in the selected access device for setting up a communication tunnel to said respective switching device of the packet data communication network connected to said selected access device when said access device is selected by said selection device.

10. The switching device according to claim 9, further comprising:
   a subscription memory device for storing subscription parameters indicating a subscription of the terminal stations to predetermined of the packet data communication networks; and
   a subscription check device for comparing said received network indication parameter with said subscription parameters stored in said subscription memory device;
   wherein said control device activates a selected access device only when said received parameter matches one of the parameters in said subscription memory device.

11. The switching device according to claim 9, wherein said communication tunnel set-up device sets-up a communication tunnel only when a validation device provided in said switching device of the packet data communication network determines a matching between an identification parameter sent from the first terminal station and one of a plurality of identification parameters stored in a identification memory device provided in said switching device.

12. The switching device according to claim 9, wherein said network identification parameter further indicates the data communication type.

13. The switching device according to claim 9, wherein the mobile radio telecommunication network is a GSM-based radio communication network and said packet data communication networks comprise at least one of a company intranet, a X.25 network, an internet protocol based network, and a General Packet Radio Service (GPRS) based network.

14. The switching device according to claim 9, wherein
   a subscription memory device for storing subscription parameters indicating a subscription of the terminal stations to predetermined of the packet data communication networks; and
   a subscription check device for comparing said received network indication parameter with said subscription parameters stored in said subscription memory device; wherein
      said control device activates a selected access device only when said received parameter matches one of the parameters in said subscription memory device; and
      said reception device and said selection device are provided in a Serving GPRS Support Node (SGSN) of a General Packet Radio Service (GPRS) system serving the first terminal station and said access device is a Gateway GPRS Support Node (GGSN) connected to said Serving GPRS Support Node (SGSN) and to the selected packet data communication network, wherein said selection device selects a Gateway GPRS Support Node (GGSN) connected to said indicated packet data communication network; and
      said subscription memory device is a Home Location Register (HLR) of the mobile radio telecommunication network, said subscription check device is provided in said Serving GPRS Support Node (SGSN) and said access device is an access server provided in said Gateway GPRS Support Node (GGSN).

15. The switching device according to claim 9, wherein the mobile radio telecommunication network is a GSM-based radio communication network and said packet data communication networks comprise at least one of a company intranet, a X.25 network, an internet protocol based network, and a General Packet Radio Service (GPRS) based network; and
   said switching device of said packet data communication system is an Internet Service Provider and said network indication parameter contains a first field indicating the access server identity and a second field indicating the Internet Service Provider identity.

16. The switching device according to claim 11, wherein said switching device of said packet data communication networks is an Internet Service Provider and said network indication parameter contains a first field indicating the access server identity and a second field indicating the Internet Service Provider identity; and said access device is a DHCP-Server of said Internet Service Provider.

17. The switching device according to claim 9, wherein the mobile radio telecommunication network is a GSM-based radio communication network and said packet data communication networks comprise at least one of a company intranet, a X.25 network, an internet protocol based network, and a General Packet Radio Service (GPRS) based network; and said network indication parameter is a parameter which is transmitted to said switching device of said mobile radio communication network when a PDP Context Activation Procedure is performed in said GPRS system.

18. A telecommunication system for providing packet data communications between a first and a second terminal station thereof, comprising:

at least one mobile radio communication network to which said first terminal station is connected; and a plurality of packet data communication networks, said second terminal station being connected to one of said packet data communication networks via a communication path, and said communication networks being connected, respectively, via a communication tunnel to a switching device including:

a reception means for receiving a network indication parameter indicating a predetermined packet data communication network from said first terminal station;

a plurality of access devices each providing an access respectively to one of said connected packet data communication networks; wherein each said access device includes a communication tunnel set up device for setting up a respective communication tunnel between said access device and a respective switching device of the respective packet data communication network;

a selection device adapted to select one of said access devices in accordance with the network indication parameter; and wherein a control device is provided in said access device adapted to activate the communication tunnel set up device provided in the selected access device for setting up a communication tunnel to said respective switching device of the packet data communication network connected to said selected access device when said access device is selected by said selection device.

19. The system according to claim 18, wherein said switching device further comprises:

a subscription memory device for storing subscription parameters indicating a subscription of the terminal stations to predetermined of said packet data communication networks; and a subscription check device for comparing said received network indication parameter with said subscription parameters stored in said subscription memory device;

wherein said control device activates a selected access device only when said received parameter matches one of the parameters in said subscription memory device.

20. The system according to claim 18, wherein the first terminal station comprises an identification device for sending an identification parameter to said switching device of the packet data communication network; and said communication tunnel set-up device sets-up a communication tunnel only when a validation device provided in said switching device of the packet data communication network determines a matching between an identification parameter sent from the first terminal station and one of a plurality of identification parameters stored in a identification memory device provided in said switching device.

21. The system according to claim 18, wherein said network identification parameter further indicates the data communication type.

22. The system according to claim 18, wherein said mobile radio telecommunication network is a GSM-based radio communication system network and said packet data communication networks comprise at least one of a company intranet, a X.25 network, an internet protocol based network, and General Packet Radio Service (GPRS) based network.

23. The system according to claim 18, wherein a subscription memory device for storing subscription parameters indicating a subscription of the terminal stations to predetermined of said packet data communication networks; and a subscription check device for comparing said received network indication parameter with said subscription parameters stored in said subscription memory device; wherein said control device activates a selected access device only when said received parameter matches one of the parameters in said subscription memory device; and said reception device and said selection device are provided in a Serving GPRS Support Node (SGSN) of a General Packet Radio Service (GPRS) system serving the first terminal station and said access device is a Gateway GPRS Support Node (GGSN) connected to said Serving GPRS Support Node (SGSN) and to said selected packet data communication networks, wherein said selection device selects a Gateway GPRS Support Node (GGSN) connected to said indicated packet data communication networks and said subscription memory device is a Home Location Register (HLR) of said mobile radio telecommunication network, said subscription check device is provided in said Serving GPRS Support Node (SGSN) and said access device is an access server provided in said Gateway GPRS Support Node (GGSN).

24. The system according to claim 18, wherein said reception device and said selection device are provided in a Serving GPRS Support Node (SGSN) of a General Packet Radio Service (GPRS) system serving the first terminal station and said access device is a Gateway GPRS Support Node (GGSN) connected to said Serving GPRS Support Node (SGSN) and to said selected packet data communication network, wherein said selection device selects a Gateway GPRS Support Node (GGSN) connected to said indicated packet data communication network;

a subscription memory device for storing subscription parameters indicating a subscription of the terminal stations to predetermined of said packet data communication network, wherein said subscription memory device is a Home Location Register (HLR) of said mobile radio telecommunication network;

a subscription check device for comparing said received network indication parameter with said subscription parameters stored in said subscription memory device, wherein said subscription check device is provided in said Serving GPRS Support Node (SGSN) and said access device is an access server provided in said Gateway GPRS Support Node (GGSN); and said switching device of said packet data communication network is an Internet Service Provider and said network indication parameter contains a first field indicating the access server identity and a second field indicating the Internet Service Provider identity.

25. The system according to claim 20, wherein said mobile radio communication system is a GSM-based radio telecommunication network and said packet data communication networks comprise at least one of a company intranet, a X.25 network, an internet protocol based network, and a General Packet Radio Service (GPRS) based network; and said access device is a DHCP-Server of an Internet Service Provider.

26. The system device according to claim 18, wherein said mobile radio telecommunication network is a GSM-based radio communication system network and said packet data communication networks comprise at least one of a company intranet, a X-25 network, an internet protocol based network, and a General Packet Radio Service (GPRS) based network: and said network indication parameter is a parameter which is transmitted to said switching device of said mobile radio communication network when a PDP Context Activation Procedure is performed in said GPRS system.

\* \* \* \* \*